US012060679B2

(12) United States Patent
Tisserat et al.

(10) Patent No.: US 12,060,679 B2
(45) Date of Patent: Aug. 13, 2024

(54) LIGNOCELLULOSIC COMPOSITES PREPARED WITH AQUEOUS ALKALINE AND UREA SOLUTIONS IN COLD TEMPERATURES SYSTEMS

(71) Applicants: Bradley University, Peoria, IL (US); The United States of America, as represented by the Secretary of Agriculture, Washington, DC (US)

(72) Inventors: Brent Tisserat, Washington, IL (US); Luke Haverhals, Peoria, IL (US); Zengshe Liu, Morton, IL (US)

(73) Assignee: Bradley University, Peoria, IL (US)

( * ) Notice: Subject to any disclaimer, the term of this patent is extended or adjusted under 35 U.S.C. 154(b) by 655 days.

(21) Appl. No.: 17/212,345

(22) Filed: Mar. 25, 2021

(65) Prior Publication Data

US 2021/0207320 A1 Jul. 8, 2021

Related U.S. Application Data

(62) Division of application No. 15/429,058, filed on Feb. 9, 2017, now Pat. No. 10,995,452.

(60) Provisional application No. 62/377,316, filed on Aug. 19, 2016, provisional application No. 62/293,172, filed on Feb. 9, 2016.

(51) Int. Cl.
| | |
|---|---|
| *D21C 3/02* | (2006.01) |
| *C08L 97/02* | (2006.01) |
| *D21C 3/20* | (2006.01) |
| *D21C 3/22* | (2006.01) |
| *D21C 5/00* | (2006.01) |
| *D21C 5/02* | (2006.01) |
| *D21H 11/12* | (2006.01) |
| *D21H 11/14* | (2006.01) |
| *D21H 21/18* | (2006.01) |
| *D21H 21/34* | (2006.01) |
| *D21H 21/36* | (2006.01) |
| *D21J 3/00* | (2006.01) |
| *D21J 5/00* | (2006.01) |

(52) U.S. Cl.
CPC ............. *D21C 3/022* (2013.01); *C08L 97/02* (2013.01); *D21C 3/02* (2013.01); *D21C 3/20* (2013.01); *D21C 3/22* (2013.01); *D21C 5/00* (2013.01); *D21C 5/022* (2013.01); *D21H 11/12* (2013.01); *D21H 11/14* (2013.01); *D21H 21/18* (2013.01); *D21H 21/34* (2013.01); *D21H 21/36* (2013.01); *D21J 3/00* (2013.01); *D21J 5/00* (2013.01); *C08L 2201/06* (2013.01)

(58) Field of Classification Search
None
See application file for complete search history.

(56) References Cited

U.S. PATENT DOCUMENTS

| | | |
|---|---|---|
| 1,943,176 A | 1/1934 | Charles |
| 2,111,486 A | 3/1938 | Bird |
| 3,172,994 A | 3/1965 | Peay |
| 3,274,013 A | 9/1966 | Batt |
| 3,447,956 A | 6/1969 | Johnson |
| 3,510,390 A | 5/1970 | Bjorksten |
| 3,711,316 A | 1/1973 | Angliss |
| 4,187,332 A | 2/1980 | Fouche |
| 4,522,934 A | 6/1985 | Shum et al. |
| 4,562,107 A | 12/1985 | Daniels |
| 4,586,934 A | 5/1986 | Blalock et al. |
| 4,597,798 A | 7/1986 | Kamata et al. |
| 4,622,238 A | 11/1986 | Franz et al. |
| 4,705,523 A | 11/1987 | Hussamy |
| 4,832,864 A | 5/1989 | Olson |
| 4,926,626 A | 5/1990 | Andonov |
| 4,938,832 A | 7/1990 | Schmalz |
| 4,970,156 A | 11/1990 | Avrameas et al. |
| 5,077,414 A | 12/1991 | Arduengo |
| 5,369,861 A | 12/1994 | Ball et al. |
| 5,378,246 A | 1/1995 | Gurley |
| 5,410,034 A | 4/1995 | Isogai |
| 5,471,720 A | 12/1995 | Ball et al. |

(Continued)

FOREIGN PATENT DOCUMENTS

| | | |
|---|---|---|
| CN | 1546556 A | 11/2004 |
| CN | 103965519 A | 8/2014 |

(Continued)

OTHER PUBLICATIONS

Qi, Haisong et al., "Properties of Films Composed of Cellulose Nanowhiskers and a Cellulose Matrix Regenerated from Alkali/Urea Solution.", Biomacromolecules, 2009, pp. 1597-1602, vol. 10.
Cai, Jie et al., "Unique gelation behavior of celloluse in NaOH/urea aqueous solution.", Biomacromolecules, 2006, vol. 7, pp. 183-189.
International Search Report and Written Opinion received for PCT/US2017/017254, mailed on May 17, 2017, 9 pages.
International Search Report and Written Opinion received for PCT/US2017/047834, mailed on Nov. 30, 2017, 11 pages.
International Search Report and Written Opinion received for PCT/US2016/060149, Mar. 2, 2017, 9 pages.
Tisserat, Brent et al., "Ionic Liquid-Facilitated Preparation of Lignocellulosic Composites", International Journal of Polymer Science, 2015, pp. 1-9, Article ID 181097, Hindawi Publishing Corporation.

(Continued)

*Primary Examiner* — Sheeba Ahmed
(74) *Attorney, Agent, or Firm* — Randall Danskin P.S.

(57) ABSTRACT

Unique, inexpensive, and strong biocomposites are obtained from blending cellulose matrix materials pith lignocellulosic reinforcement materials with the aid of alkaline aqueous solvent and cold temperatures. These lignocellulosic composites (LCs) are produced without use of any thermoplastic resins, adhesives, catalysts, plasticizers or d chemical or physical procedures. The LCs include a matrix and a reinforcement material. The matrix is a cellulose material (e.g., cotton, hemp, flax, or wood) that is liquefied using an aqueous alkaline solvent solution under cold temperatures to more readily adhere and or incorporate/encapsulate the lignocellulosic reinforcements (wood chips, fibers, and other lignocellulosic sources).

20 Claims, 11 Drawing Sheets

(56) References Cited

U.S. PATENT DOCUMENTS

| | | | |
|---|---|---|---|
| 5,626,952 A | 5/1997 | McAbee et al. | |
| 5,665,573 A | 9/1997 | Yde | |
| 5,679,146 A | 10/1997 | Kalt et al. | |
| 5,683,832 A | 11/1997 | Bonhote et al. | |
| 5,714,536 A | 2/1998 | Ziolo et al. | |
| 5,747,125 A | 5/1998 | Markulin | |
| 5,749,923 A | 5/1998 | Olip et al. | |
| 5,792,399 A | 8/1998 | Meister et al. | |
| 5,827,602 A | 10/1998 | Koch et al. | |
| 5,856,513 A | 1/1999 | Ue et al. | |
| 6,245,385 B1 | 6/2001 | Takahashi et al. | |
| 6,423,000 B1 | 7/2002 | Berry | |
| 8,202,398 B2 | 6/2012 | Scobie | |
| 8,574,358 B2 | 11/2013 | Biscan et al. | |
| 8,574,385 B2 | 11/2013 | Biscan et al. | |
| 8,709,150 B2 | 4/2014 | Nayak et al. | |
| 8,784,503 B2 | 7/2014 | Costard | |
| 8,784,691 B2 | 7/2014 | Spear et al. | |
| 8,882,924 B2 | 11/2014 | O'Connor | |
| 8,883,300 B1 | 11/2014 | Miller et al. | |
| 8,986,437 B2 | 3/2015 | Blount | |
| 9,103,065 B2 | 8/2015 | Tanaka et al. | |
| 9,120,701 B2 | 9/2015 | Amritphale et al. | |
| 9,163,123 B2 | 10/2015 | Cao et al. | |
| 9,175,147 B2 | 11/2015 | Ton-That et al. | |
| 9,187,624 B2 | 11/2015 | Lu et al. | |
| 9,187,865 B2 | 11/2015 | Nelson et al. | |
| 9,193,851 B2 | 11/2015 | Samain et al. | |
| 9,228,081 B2 | 1/2016 | Nelson et al. | |
| 10,995,452 B2 | 5/2021 | Tisserat | |
| 2002/0153107 A1 | 10/2002 | Roffael | |
| 2004/0072487 A1 | 4/2004 | Neumann et al. | |
| 2008/0023162 A1 | 1/2008 | Myllymaki et al. | |
| 2010/0038047 A1 | 2/2010 | Scobie | |
| 2012/0000621 A1* | 1/2012 | Stigsson | C08H 8/00 162/158 |
| 2012/0082296 A1 | 4/2012 | Medoff | |
| 2012/0178921 A1 | 7/2012 | O'Connor | |
| 2012/0231254 A1 | 9/2012 | Scobie | |
| 2014/0026787 A1 | 1/2014 | Amritphale et al. | |
| 2014/0088252 A1 | 3/2014 | Harlin et al. | |
| 2014/0090157 A1 | 4/2014 | Ramirez | |
| 2014/0121306 A1 | 5/2014 | Ton-That et al. | |
| 2014/0342156 A1 | 11/2014 | Seo et al. | |
| 2015/0050486 A1 | 2/2015 | Kim et al. | |
| 2015/0096470 A1 | 4/2015 | Fernandez et al. | |
| 2015/0152650 A1 | 6/2015 | Cernohous et al. | |
| 2015/0203405 A1 | 7/2015 | Sitaram et al. | |
| 2015/0232385 A1 | 8/2015 | Beraldo et al. | |
| 2015/0284566 A1 | 10/2015 | Sniady et al. | |
| 2015/0284567 A1 | 10/2015 | Williamson et al. | |
| 2015/0284568 A1 | 10/2015 | Sniady et al. | |
| 2015/0368371 A1 | 12/2015 | Rogers et al. | |
| 2016/0257815 A1 | 9/2016 | Varnell | |
| 2017/0166480 A1 | 6/2017 | Haverhals | |
| 2017/0190850 A1 | 7/2017 | Haverhals et al. | |
| 2018/0016735 A1 | 1/2018 | Haverhals et al. | |
| 2018/0291536 A1 | 10/2018 | Haverhals et al. | |
| 2019/0055675 A1 | 2/2019 | Haverhals et al. | |
| 2019/0119851 A1 | 4/2019 | Tisserat | |
| 2019/0358913 A1 | 11/2019 | Haverhals et al. | |

FOREIGN PATENT DOCUMENTS

| | | |
|---|---|---|
| CN | 104262642 A | 1/2015 |
| CN | 109153856 A | 1/2019 |
| EP | 0648242 | 4/1995 |
| EP | 2875924 A1 | 5/2015 |
| EP | 3383955 A1 | 10/2018 |
| EP | 3414286 A1 | 12/2018 |
| JP | 06004934 B2 | 1/1994 |
| KR | 1019910001152 A | 1/1991 |
| WO | 9401488 | 1/1994 |
| WO | 2006095021 A1 | 9/2006 |
| WO | 2015089611 A1 | 6/2015 |
| WO | 2015142159 A1 | 9/2015 |
| WO | 2016141126 | 9/2016 |
| WO | 2017079324 A1 | 5/2017 |
| WO | 2017139504 A1 | 8/2017 |
| WO | 2017165891 | 9/2017 |
| WO | 2018035528 | 2/2018 |

OTHER PUBLICATIONS

Liu, Chanfu et al., "Dissolution of Cellulose in Ionic Liquids and Its Application for Cellulose Processing and Modification", American Chemical Society, 2010, Chapter 16, pp. 287-297, vol. 23.

Sarul, Taner I., et al., "Alternative Production Methods for Lignocellulosic Composite Materials," Journal of Thermoplastic Composite Materials, May 2010, pp. 375-384, vol. 23.

Satyanarayana, Kestur G., et al., "Biodegradable composites based on lignocellulosic fibers—An overview," Progress in Polymer Science, 2009, pp. 982-1021, vol. 34, Elsevier Ltd.

Zhao, Yulin et al., "Enhanced Enzymatic Hydrolysis of Spruce by Alkaline Pretreatment at Low Temperature," Biotechnology and Bioengineering, Nov. 19, 2007, pp. 1320-1328, Wiley.

Cai, Jie et al., "Rapid Dissolution of Cellulose in LiOH/Urea and NaOH/Urea Aqueous Solutions," Macromolecular Bioscience, 2005, pp. 539-548, vol. 548, WILEY-VCH Verlag Gmbh & Co. KGaA.

Cai, Jie et al., "Novel Fibers Prepared from Cellulose in NaOH/Urea Aqueous Solution," Macromolecular Rapid Communications, 2004, pp. 1558-162, vol. 25, WILEY-VCH Verlag Gmbh & Co. KGaA.

Medronho, Bruno et al., "Brief overview on cellulose dissolution/regeneration interactions and mechanisms," Advances in Colloid and Interface Science, 2014, pp. 502-508, vol. 222, Elsevier, B.V.

Kihlman, Martin et al., "Cellulose Dissolution in an Alkali Based Solvent: Influence of Additives and Pretreatments," J. Braz. Chem. Soc., 2013, pp. 295-303, vol. 24, No. 2, Sociedade Brasileira de Química.

Zhou, Jinping et al., "Cellulose microporous membranes prepared from NaOH/urea aqueous solution," Journal of Membrane Science, 2002, pp. 77-90, vol. 210, Elsevier Science B.V.

Chen, Xuming et al., "X-ray studies of regenerated cellulose fibers wet spun from cotton linter pulp in NaOH/thiourea aqueous solutions", Polymer, 2006, pp. 2839-2848, vol. 47, Elsevier Ltd.

Dragnevska, M. et al., "Development of a Continuous Method for Production of Coppersulphide Wood-Polymer Plate Nanocomposite Materials," Journal of the University of Chemical Technology and Metallurgy, 2011, pp. 349-356, vol. 46, No. 4.

Liu, Li et al., "Corn stover pretreatment by inorganic salts and its effects on hemicellulose and cellulose degradation," Bioresource Technology, 2009, pp. 5865-5871, vol. 100, Elsevier Ltd.

Medronho, Bruno et al., "Competing forces during cellulose dissolution: From solvents to mechanisms," Current Opinion in Colloid & Interface Science, 2014, 9 pages.

Zhang, Lina et al., "Dissolution and Regeneration of Cellulose in NaOH/Thiourea Aqueous Solution," Journal of Polymer Science, 2002, pp. 1521-1529, vol. 40, Wiley Periodicals, Inc.

Cai, Jie et al., "Dynamic Self-Assembly Induced Rapid Dissolution of Cellulose at Low Temperatures," Macromolecules, 2008, pp. 9345-9351, vol. 41, No. 23, American Chemical Society.

Keshk, Sherif M.A.S., "Effect of different alkaline solutions on crystalline structure of cellulose at different temperatures," Carbohydrate Polymers, 2015, pp. 685-662, vol. 115, Elsevier Ltd.

Kihlman, Martin et al., "Effect of various pulp properties on the solubility of cellulose in sodium hydroxide solutions," Holzforschung, 2012, pp. 601-660, vol. 66, Walter de Gruyter.

Elenga, Raymond, et al., "Effects of Alkali Treatment on the Microstructure, Composition, and Properties of the Raffia textilis Fiber", BioResources, pp. 2934-2949, vol. 8, No. 2.

Mao, Yuan et al., "Effects of Coagulation Conditions on Properties of Multifilament Fibers Based on Dissolution of Cellulose in NaOH/Urea Aqueous Solution," Ind. Eng. Chem. Res., 2008, pp. 8676-8683, vol. 47, American Chemical Society.

Glad, Brayden E. et al., "Geopolymer with Hydrogel Characteristics via Silane Coupling Agent Additives," J. Am. Ceram. Soc., 2014, pp. 295-302, vol. 97, No. 1, The American Ceramic Society.

(56) References Cited

OTHER PUBLICATIONS

Pinkert, Andre et al., "Ionic Liquids and Their Interaction with Cellulose," Chemical Reviews, 2009, pp. 6712-6728, vol. 109, No. 12, American Chemical Society.
Karade, S.R. et al., "Cement-Bonded Lignocellulosic Composites For Building Applications," Metals Materials and Processes, 2005, pp. 129-140, vol. 17, No. 2.
Lue, Ang et al., "Light scattering study on the dynamic behaviour of cellulose inclusion complex in LiOH/urea aqueous solution," Polymer, 2011, pp. 3857-3864, vol. 52, Elsevier Ltd.
Mercerised cotton, https://en.wikipedia.org/wiki/Mercerised_cotton, last accessed on Apr. 27, 2016.
"What Is Cotton Fiber | Chemical Composition Of Cotton Fiber," Textile Engineering & Fashion Design Blog, Jun. 23, 2012, http://textilefashionstudy.com/what-is-cotton-fiber-chemical-composition-of-cotton-fiber/.
Zhang, Shuai et al., "Novel Fibers Prepared from Cellulose in NaOH/Thiourea/Urea Aqueous Solution," Fibers and Polymers, 2009, pp. 34-39, vol. 10, No. 1.
Zhang, Li et al., "Novel lignocellulosic hybrid particleboard composites made from rice straws and coir fibers," Materials and Design, 2014, pp. 19-26, vol. 55, Elsevier Ltd.
Nechita, Petronela et al., "The Biodegradability and Mechanical Strength of Nutritive Pots for Vegetable Planting Based on Lignocellulose Composite Materials," BioResources, 2010, pp. 1102-1113, vol. 5, No. 2.
Wynia R., "Plant Guide for Osage orange, (*Maclura pomifera*)," USDA—Natural Resources Conservation Service, 2011 Manhattan Plant Materials Center. Manhattan, KS 66502.
Clapp, Timothy G. et al., "Quality initiatives reshape the textile industry", Quality Digest, 2001, QCI International.
Fu, Lian-Hua et al., "Research on the formation mechanism of composites from lignocelluloses and CaCO3," Materials Science and Engineering C, 2014, pp. 216-224, vol. 44.
Sen, Sanghamitra et al., "Review of Cellulose Non-Derivatizing Solvent Interactions with Emphasis on Activity in Inorganic Molten Salt Hydrates," ACS Sustainable Chemistry & Engineering, 2013, pp. 858-870, vol. 1, American Chemical Society.
Heinze, Thomas et al., "Solvents Applied in the Field of Cellulose Chemistry—A Mini Review," Polimeros: Ciencia e Tecnologia, 2005, pp. 84-90, vol. 15, No. 2.
Qin, Xingzhen et al., "Stability of inclusion complex formed by cellulose in NaOH/urea aqueous solution at low temperature," Carbohydrate Polymers, 2013, pp. 1315-1320, vol. 92, Elsevier Ltd.
Chen, Xuming, et al., "Structure Study of Cellulose Fibers Wet-Spun from Environmentally Friendly NaOH/Urea Aqueous Solutions," Biomacromolecules, 2007, pp. 1918-1926, vol. 8, American Chemical Society.
Chen, Rui et al., "Utilization of sweet sorghum fiber to reinforce fly ash-based geopolymer," J Mater Sci, 2014, pp. 2548-2558, vol. 49.
Gan, Sinyee et al. "Synthesis of Liquid Hot Water Cotton Linter to Prepare Cellulose Membrane using NaOH/Urea or LiOH/Urea," BioResources, 2015, pp. 2244-2255, vol. 10, No. 2.
Paukszta, Dominik et al., "The Influence of Processing and the Polymorphism of Lignocellulosic Fillers on the Structure and Properties of Composite Materials—A Review," Materials, 2013, pp. 2747-2767, vol. 6.
Tisserat, Brent, et al., "Mechanical and thermal properties of high density polyethylene-dried distillers grains with soluble composites" BioResources.com, 2013, pp. 59-75, vol. 8, No. 1.
Salem, Mohamed Z.M. et al., "Physico-Chemical Characterization of Wood from Maclura Pomifera (Raf.) C.K. Schneid. Adapted to the Egyptian Environmental Conditions," Journal of Forest Products & Industries, 2013, pp. 53-57, vol. 2 No. 2.
Tisserat, Brent, et al., "Lignocellulosic Composites Prepared Utilizing Aqueous Alkaline/Urea Solutions with Cold Temperatures," International Journal of Polymer Science, 2018, 12 pages, vol. 2018.
Gericke, Martin et al., "Ionic Liquids—Promising but Challenging Solvents for Homogeneous Derivatization of Cellulose," Molecules, 2012, pp. 7458-7502, vol. 17.
Ruan, Dong et al., "Structure and Properties of Novel Fibers Spun from Cellulose in NaOH/Thiourea Aqueous Solution," Macromolecular Bioscience, 2004, pp. 1105-1112, vol. 4.
Iniguez, C.G. et al., "Recycling Agave Bagasse of the Tequila Industry," Advances in Chemical Engineering and Science, 2014, pp. 135-142, vol. 4.
Li, Kai et al., "Extraordinary Reinforcement Effect of Three-Dimensionally Nanoporous Cellulose Gels in Poly($\epsilon$-caprolactone) Bionanocomposites," ACS Applied Materials & Interfaces, 2014, pp. 7204-7213, vol. 6.
Davis, Sarah C. et al., "The global potential for Agave as a biofuel feedstock," GCB Bioenergy, 2011, pp. 68-78, vol. 3.
Tisserat, Brent et al., "Evaluation of the Mechanical and Thermal Properties of Coffee Tree Wood Flour—Polypropylene Composites," BioResources, 2014, pp. 4449-4467, vol. No. 2.
Li, Ming-Fei et al., "Characterization of Extracted Lignin of Bamboo (*Neosinocalamus affinis*) Pretreated With Sodium Hydroxide/Urea Solution at Low Temperature", BioResources, 2010, pp. 1762-1778, vol. 5. No. 3.
Perez-Pimienta, Jose A. et al., "Comparison of the impact of ionic liquid pretreatment on recalcitrance of agave bagasse and switchgrass", Biosource Technology, 2013, pp. 18-24, vol. 127.
Tisserat, Brent et al., "Effect of particle size, coupling agent and DDGS additions on Paulownia wood polypropylene composites," Journal of Reinforced Plastics & Composites, 2014, pp. 1279-1293, vol. 33, No. 14.
Liebert, Tim et al., "Interaction of Ionic Liquids With Polysaccharides 5. Solvents and Reaction Media for the Modification of Cellulose," 2008, BioResources, pp. 576-601, vol. 3 No. 2.
Perez-Pimienta, Jose A. et al., "Characterization of agave bagasse as a function of ionic liquid pretreatment," Biomass and Bioenergy, 2015, pp. 180-188, vol. 75.
Perez-Pimienta, Jose A. et al., "Fractional pretreatment of raw and calcium oxalate-extracted agave bagasse using ionic liquid and alkaline hydrogen peroxide," Biomass and Bioenergy, 2016, pp. 48-55, vol. 91.
Smith, Jeffrey L. et al., "Osage Orange (*Maclura pomifera*): History and Economic Uses," Economic Botany, 1981, pp. 24-41, vol. 35, No. 1.
Dormanns, Jan W. et al., "Solvent infusion processing of all-cellulose composite laminates using an aqueous NaOH/urea solvent system," Composites: Part A, 2016, pp. 130-140, vol. 82.
Piltonen, Petteri et al., "Green and efficient method for preparing all-cellulose composites with NaOH/urea solvent," Composites Science and Technology, 2016, pp. 153-158, vol. 135.
Feng, Li et al., "Research progress on dissolution and functional modification of cellulose in ionic liquids," Journal of Molecular Liquids, 2008, pp. 1-5, vol. 142.
Tronc, E., et al., "Blue Agave fiber esterification for the reinforcement of thermoplastic composites," Carbohydrate Polymers, 2007, pp. 245-255, vol. 67.
Luo, Xiaogang, et al., "New solvents and functional materials prepared from cellulose solutions in alkali/urea aqueos system," Food Research International, 2013, pp. 387-400, vol. 52.
Satyanarayana, Kestur G. et al., "Characterization of blue agave bagasse fibers of Mexico," Composites Part A, 2013, pp. 153-161, vol. 45.
Communication Pursuant to to Rules 161(2) and 162 EPC received for European Application No. 16862894.9, mailed Jun. 12, 2018, 3 pages.
Final Office Action received for U.S. Appl. No. 15/429,058, mailed Aug. 16, 2019, 16 pages.
International Preliminary Report on Patentability and Written Opinion received for PCT Application No. PCT/US2016/60149, mailed May 17, 2018, 8 pages.
International Preliminary Report on Patentability and Written Opinion received for PCT Application No. PCTUS2017/017254, mailed Aug. 14, 2018, 7 pages.
Non Final Office Action received for U.S. Appl. No. 15/341,972, mailed on Nov. 9, 2018, 13 pages.
Non-Final Office Action received for U.S. Appl. No. 15/429,058, mailed on Mar. 7, 2019, 10 pages.

(56) References Cited

OTHER PUBLICATIONS

Non-Final Office Action received for U.S. Appl. No. 15/341,972, mailed on Feb. 8, 2018, 13 pages.
International Preliminary Report on Patentability and Written Opinion Received for Application No. PCT/US2017/047834 dated Feb. 19, 2019, 9 pages.
Zhang et al., The dual effects of lignin content on enzymatic hydrolysis using film composed of cellulose and lignin as a structural model, Bioresourse Technology, 2015, vol. 200 (published online 2015), pp. 761-769.
Ma, Hao et al., Green composite films composed of nanocrystalline cellulose and a cellulose matrix regenerated from functionalized ionic liquid solution, Carbohydrate Polymers, vol. 84, No. 1, pp. 383-389 (Feb. 11, 2011).
Extended European Search Report received for EP application 17750784.5, mailed Sep. 30, 2019.
Reddy et al., Introduction to regenerated cellulose fibers; Innovative Biofibers from Renewable Resources; Springer-Verlag Berlin Heidelberg 2015; pp. 51-54.
Adel, Abeer M. et al., Characterization of microcrystalline cellulose prepared from lignocellulosic materials. Part II: Physicochemical Properties.
Ramamoorthy, Sunil Kumar et al., A review of natural fibers used in biocomposites: plant, animal and regenerated cellulose fibers; Polymer Reviews, Jan. 2015.
Miyake, Hajime et al., Tensile Properties of wet cellulose, Polymer Journal, vol. 32, No. 1, pp. 29-32 (2000).
De Araugo, M., Natural and man-made fibres: physical and mechanical properties; University of Minho, Portugal, 2011.
Zhao, Q., et al., Novel all-cellulose ecocomposites prepared in ionic liquids, Cellulose, vol. 16 (2009), pp. 217-226.
Applicant Initiated Interview Summary received for U.S. Appl. No. 15/429,058, mailed Oct. 10, 2019, 33 pages.
Non-Final Office Action received for U.S. Appl. No. 15/429,058, mailed on Jun. 5, 2020, 11 pages.
Final Office Action received for U.S. Appl. No. 15/429,058, mailed on Dec. 9, 2020, 5 pages.
Notice of Allowance received for U.S. Appl. No. 15/429,058, mailed Jan. 15, 2021, 9 pages.
Non-Final Office Action received for U.S. Appl. No. 15/682,146, mailed Oct. 24, 2019, 8 pages.
Final Office Action received for U.S. Appl. No. 15/682,146, mailed Apr. 29, 2020, 8 pages.
Non-Final Office Action received for U.S. Appl. No. 15/682,146, mailed Apr. 28, 2021, 10 pages.
Final Office Action received for U.S. Appl. No. 15/682,146, mailed Oct. 26, 2021, 12 pages.

\* cited by examiner

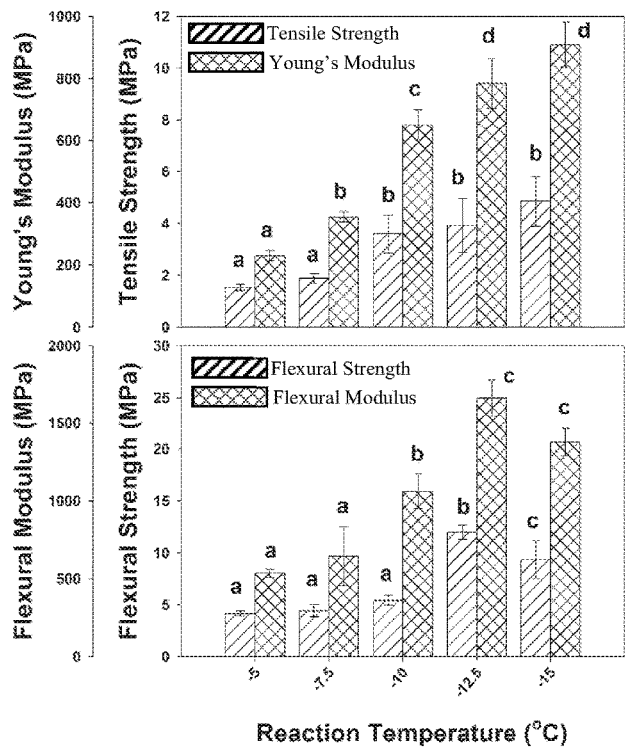
Figure 4. Influence of temperature on the mechanical properties of biocomposite composed of 25% Cotton:75% OOW. Treatment values with different letters for the same mechanical test denote statistically different effects (p ≤ 0.5).
| Treatments | TS | Tsse | YM | Ymse | Elo% | Elose | MOR | MORse | MOE | MOEse |
|---|---|---|---|---|---|---|---|---|---|---|
| -5.0000 | 1.5342 | 0.1274 | 229.5430 | 16.8250 | 21.1970 | 1.0027 | 4.1420 | 0.2300 | 534.4400 | 25.8300 |
| -7.5000 | 1.8842 | 0.1875 | 354.4000 | 16.6967 | 16.1772 | 0.6805 | 4.4372 | 0.5848 | 643.4500 | 188.7034 |
| -10.0000 | 3.5848 | 0.7262 | 650.3530 | 47.9151 | 11.4974 | 0.7917 | 5.4168 | 0.4891 | 1060.9144 | 110.6434 |
| -12.5000 | 3.9210 | 1.0240 | 784.4200 | 78.8175 | 12.3993 | 1.0356 | 11.9757 | 0.6635 | 1662.5333 | 118.8875 |
| -15.0000 | 4.8503 | 0.9520 | 908.3710 | 73.0165 | 7.2766 | 0.5461 | 9.3295 | 1.8785 | 1376.2275 | 91.4725 |
% Change
|  | TS | YM | Elo% | MOR | MOE | TS% | YM% | Elo% | MOR% | MOE% |
|---|---|---|---|---|---|---|---|---|---|---|
| -5 | 1.9 | 312.4 | 21.197 | 4.2 | 548 | 0 | 0 | 0 | 0 | 0 |
| -7.5 | 1.5 | 229.5 | 16.177 | 4.4 | 643 | -19 | -27 | -24 | 5 | 17 |
| -10 | 3.6 | 640.9 | 11.497 | 5.4 | 1061 | 90 | 105 | -46 | 28 | 93 |
| -12.5 | 3.9 | 783.4 | 12.399 | 12.0 | 1663 | 108 | 151 | -42 | 183 | 203 |
| -15 | 4.9 | 908.4 | 7.2766 | 9.3 | 1376 | 157 | 191 | -66 | 120 | 151 |

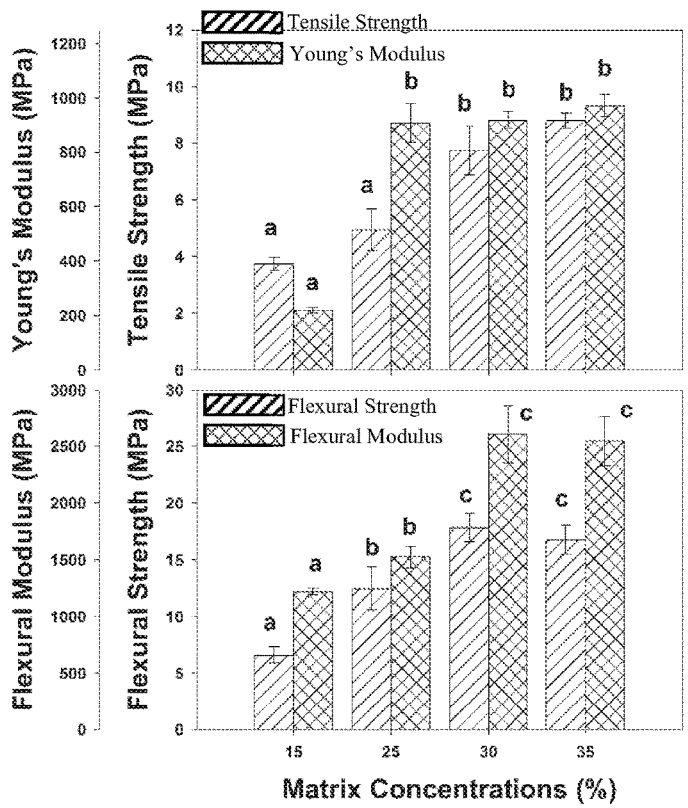

Figure 5. Influence of Cotton Matrix concentration on the mechanical properties of biocomposites composed of 25% Cotton: 75% AF/OOW. Treatment values with different letters for the same mechanical test denote statistically different effects ($p \leq 0.5$).

| Matrix Conc. (%) | TS | Tsse | YM | Ymse | Elo% | Elose | MOR | MORse | MOE | MOEse |
|---|---|---|---|---|---|---|---|---|---|---|
| 15 | 3.7 | 0.2 | 219.7 | 10.0 | 16.1 | 0.9 | 6.6 | 0.7 | 1219 | 29.5 |
| 25 | 4.9 | 0.7 | 908.4 | 73.0 | 7.3 | 0.5 | 12.5 | 1.9 | 1523 | 91.5 |
| 30 | 7.7 | 0.9 | 919.5 | 32.4 | 5.5 | 0.8 | 17.8 | 1.3 | 2607 | 255 |
| 35 | 8.8 | 0.3 | 973.2 | 42.1 | 7.5 | 0.6 | 16.8 | 1.3 | 2545 | 217 |

Percentage Change versus the Optimum level:

| Matrix Conc. (%) | TS | YM | Elo% | MOR | MOE | TS% | YM% | Elo% | MOR% | MOE% |
|---|---|---|---|---|---|---|---|---|---|---|
| 15 | 3.7 | 219.7 | 16.1 | 6.6 | 1219 | 0 | 0 | 0 | 0 | 0 |
| 25 | 4.9 | 908.4 | 7.3 | 12.5 | 1523 | 32 | 313 | -55 | 88 | 25 |
| 30 | 7.7 | 919.5 | 5.5 | 17.8 | 2607 | 107 | 318 | -66 | 170 | 114 |
| 35 | 8.8 | 973.2 | 7.5 | 16.8 | 2545 | 135 | 343 | -53 | 153 | 109 |

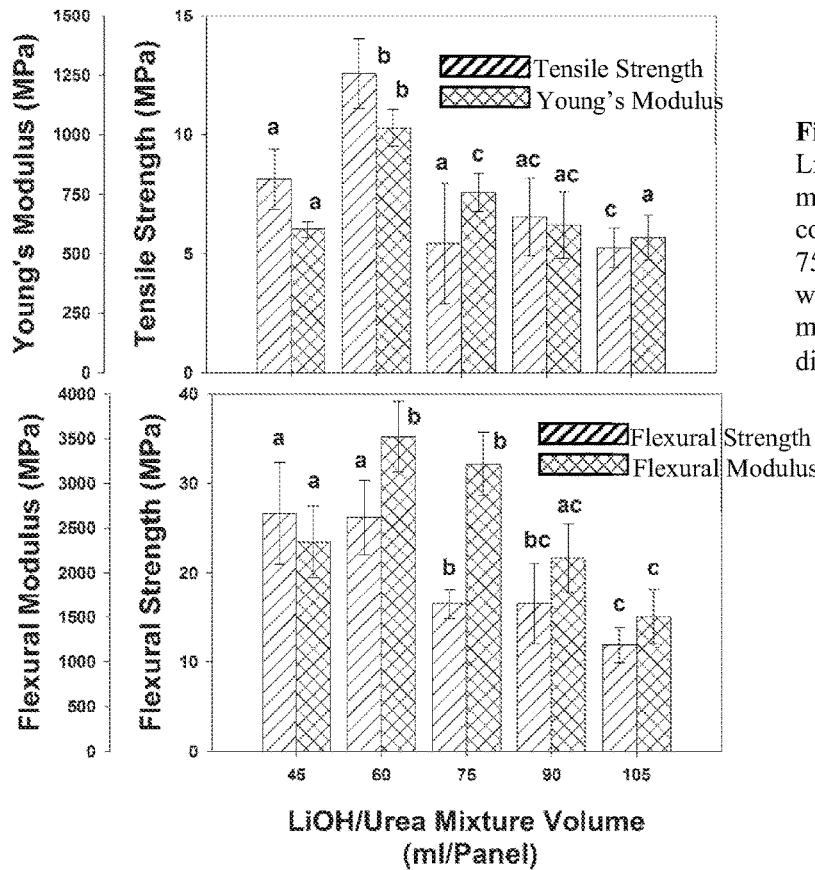
Figure 6. Effect of LiOH·H$_2$O/Urea volume on mechanical properties of panels composed of 10 g 25% Cotton: 75% AF/OOW. Treatment values with different letters for the same mechanical test denote statistically different effects (p ≤ 0.5).
| Notes | TS | Tsse | YM | Ymse | MOR | MORse | MOE | MOEse |
|---|---|---|---|---|---|---|---|---|
| 45 | 8.1 | 1.3 | 603.0 | 33.0 | 26.7 | 5.7 | 2344.9 | 399.2 |
| 60 | 12.6 | 1.5 | 1029.1 | 75.6 | 26.2 | 4.2 | 3520.3 | 393.8 |
| 75 | 5.4 | 2.5 | 759.1 | 139.9 | 16.5 | 1.6 | 3217.8 | 354.6 |
| 90 | 6.6 | 1.6 | 621.1 | 77.7 | 16.6 | 4.5 | 2166.4 | 383.3 |
| 105 | 5.3 | 0.8 | 567.8 | 95.8 | 11.9 | 2.0 | 1510.1 | 307.4 |
Percentage Change versus the Optimum level:
| Notes | TS | % | YM | % | MOR | % | MOE | % |
|---|---|---|---|---|---|---|---|---|
| 45 | 8.1 | -35.2 | 603.0 | -41.4 | 26.7 | 1.8 | 2344.9 | -33.4 |
| 60 | 12.6 | 0.0 | 1029.1 | 0.0 | 26.2 | 0.0 | 3520.3 | 0.0 |
| 75 | 5.4 | -56.8 | 759.1 | -26.2 | 16.5 | -37.0 | 3217.8 | -8.6 |
| 90 | 6.6 | -47.8 | 621.1 | -39.6 | 16.6 | -36.7 | 2166.4 | -38.5 |
| 105 | 5.3 | -58.2 | 567.8 | -44.8 | 11.9 | -54.7 | 1510.1 | -57.1 |

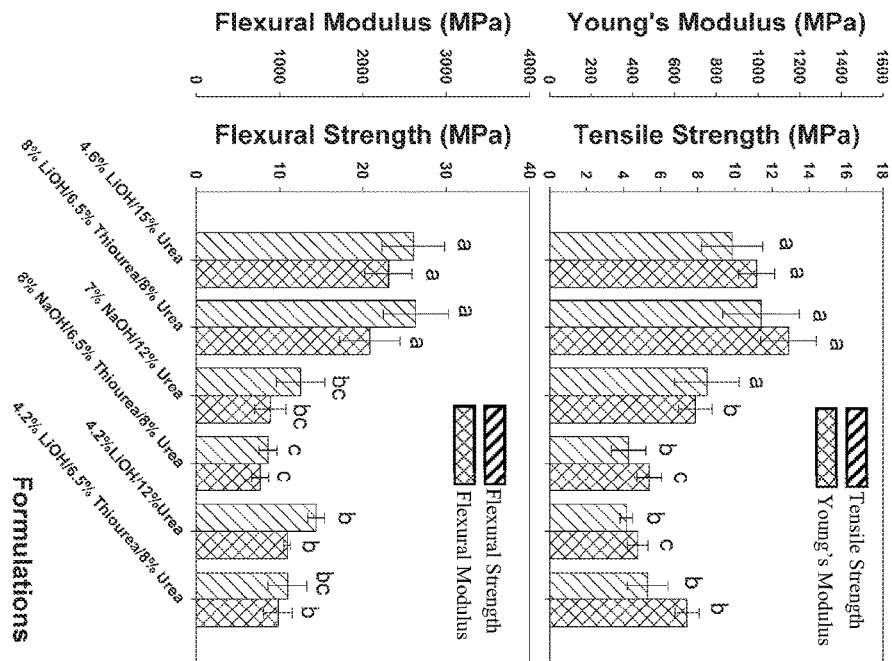

Figure 7. Effect of various alkaline aqueous solvent formulations on the mechanical properties of panels composed of 25% Cotton: 75% AF/OOW. Treatment values with different letters for the same mechanical test denote statistically different effects (p ≤ 0.5).

| Formulations | TS | YM | MOR | MOE | Reference Source |
|---|---|---|---|---|---|
| 4.6% LiOH·H$_2$O/15% Urea | 9.9 ± 1.7 | 994 ± 86 | 26.1 ± 3.7 | 2307 ± 283 | Li et al., 2014 |
| 8% LiOH·H$_2$O /6.5% Thiourea/8% Urea | 11.4 ± 2.1 | 1146 ± 133 | 26.3 ± 3.9 | 2084 ± 364 | -- |
| 7% NaOH/12% Urea | 8.5 ± 1.7 | 699 ± 81 | 12.5 ± 2.8 | 885 ± 191 | Cai et al., 2004; Qi et al., 2009; Cai and Zhang, 2005 |
| 8% NaOH/6.5% Thiourea/8% Urea | 4.3 ± 0.9 | 479 ± 60 | 8.6 ± 1.1 | 764 ± 103 | Zhang et al., 2009 |
| 4.2% LiOH·H$_2$O /12%Urea | 4.2 ± 0.3 | 424 ± 50 | 14.4 ± 1.0 | 1090 ± 42 | Cai and Zhang, 2005 |
| 4.2% LiOH·H$_2$O /6.5% Thiourea/8% Urea | 5.3 ± 1.1 | 660 ± 58 | 11.1 ± 2.4 | 980 ± 174 | -- |

% Change

| Formulations | TS | YM | MOR | MOE | TS% | YM% | MOR% | MOE% |
|---|---|---|---|---|---|---|---|---|
| 4.6% LiOH·H$_2$O/15% Urea | 9.9 | 993.7 | 26.1 | 3.7 | 0 | 0 | 0 | 0 |
| 8% LiOH·H$_2$O /6.5% Thiourea/8% Urea | 11.4 | 1146.0 | 26.3 | 3.9 | 16 | 15 | 1 | 5 |
| 7% NaOH/12% Urea | 8.5 | 698.9 | 12.5 | 2.9 | -14 | -30 | -52 | -21 |
| 8% NaOH/6.5% Thiourea/8% Urea | 4.3 | 479.2 | 8.6 | 1.1 | -57 | -52 | -67 | -71 |
| 4.2% LiOH·H$_2$O /12%Urea | 4.2 | 424.3 | 14.4 | 1.0 | -58 | -57 | -45 | -74 |
| 4.2% LiOH·H$_2$O /6.5% Thiourea/8% Urea | 5.3 | 660.2 | 11.0 | 2.4 | -46 | -34 | -58 | -36 |

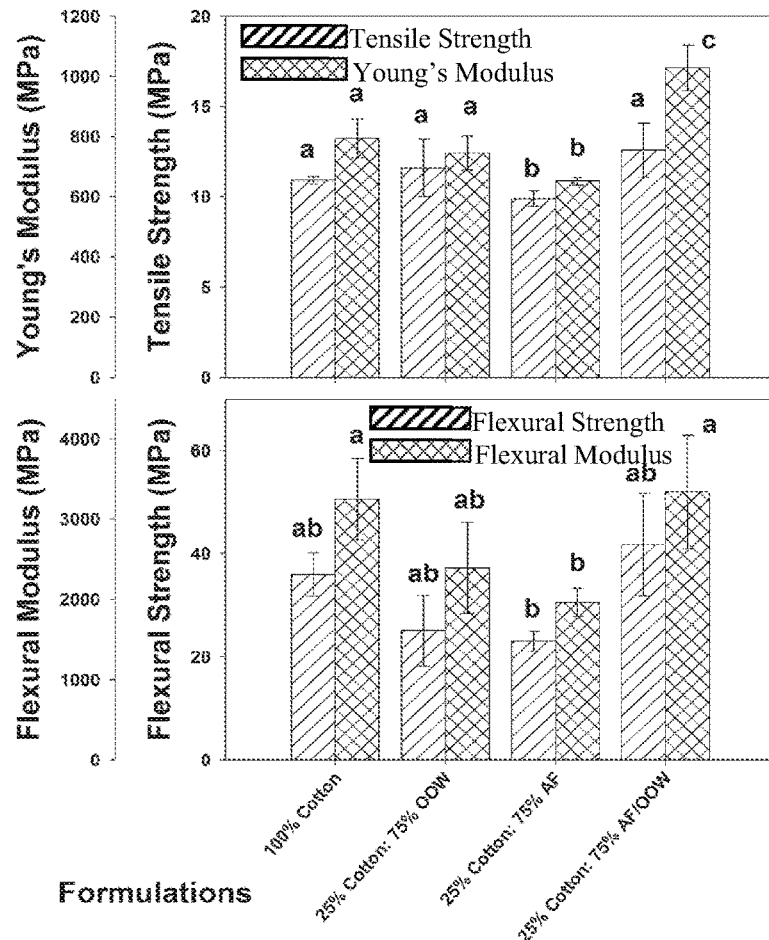

Figure 8. The influence of various reinforcement components on the biocomposite mechanical properties. Treatment values with different letters for the same mechanical test denote statistically different effects (p ≤ 0.5).

| Ingredient | TS | Tsse | YM | Ymse | MOR | MORse | MOE | MOEse |
|---|---|---|---|---|---|---|---|---|
| 100% Cotton | 10.9 | 0.2 | 795 | 65 | 36 | 4 | 3249 | 511 |
| 25% Cotton: 75% OOW | 11.6 | 1.6 | 746 | 56 | 25 | 7 | 2391 | 567 |
| 25% Cotton: 75% AF | 9.9 | 0.4 | 652 | 13 | 23 | 2 | 1963 | 173 |
| 25% Cotton: 75% AF/OOW | 12.6 | 1.5 | 1029 | 76 | 42 | 10 | 3338 | 710 |
| % Change: | | | | | | | | |
| Item | TS | | YM | | MOR | | MOE | |
| 100% Cotton | 0 | | 0 | | 0 | | 0 | |
| 25% Cotton: 75% OOW | 6 | | -6 | | -30 | | -26 | |
| 25% Cotton: 75% AF | -9 | | -18 | | -36 | | -40 | |
| 25% Cotton: 75% AF/OOW | 16 | | 29 | | 16 | | 3 | |

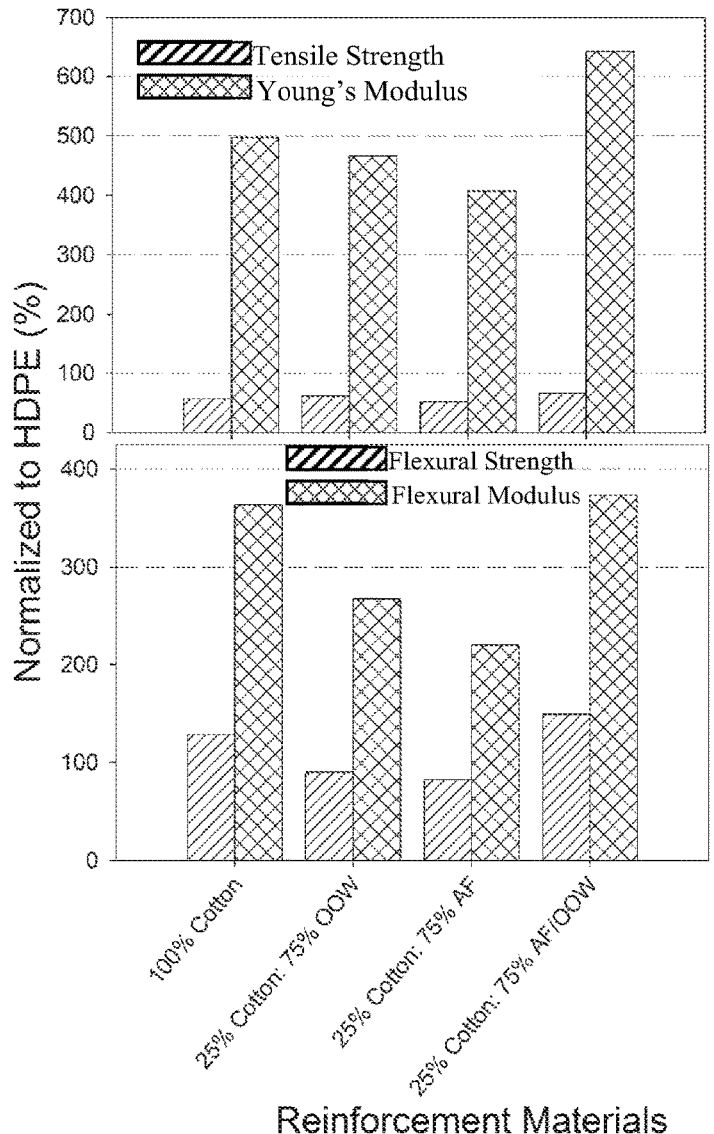
Figure 9. Normalized effect of reinforcement materials on the mechanical properties of LCs compared to HDPE.
| Normalized Changes: | | | | | % Changes: | | | |
|---|---|---|---|---|---|---|---|---|
| Treatment | TM | YM | FS | FM | TM | YM | FS | FM |
| HDPE | 100 | 100 | 100 | 100 | 0 | 0 | 0 | 0 |
| 100% Cotton | 57 | 497 | 129 | 363 | -43 | 397 | 29 | 263 |
| 25% Cotton: 75% OOW | 61 | 466 | 90 | 267 | -39 | 366 | -10 | 167 |
| 25% Cotton: 75% AF | 52 | 407 | 83 | 220 | -48 | 307 | -17 | 120 |
| 25% Cotton: 75% AF/OOW | 66 | 643 | 149 | 373 | -34 | 543 | 49 | 273 |

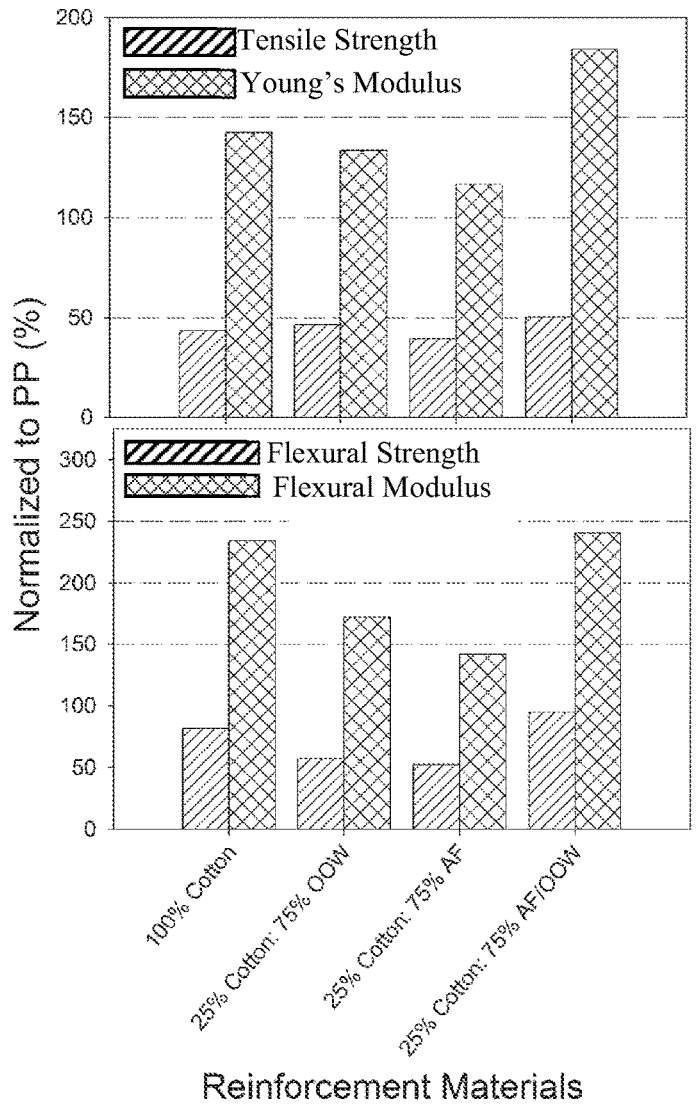
Figure 10. Normalized effect of reinforcement materials on the mechanical properties of LCs compared to PP.
| Normalized Changes: | Averages | | | | % Changes: | | | |
|---|---|---|---|---|---|---|---|---|
| Treatment | TM | YM | FS | FM | TM | YM | FS | FM |
| PP | 100 | 100 | 100 | 100 | 0 | 0 | 0 | 0 |
| 100% Cotton | 44 | 142 | 82 | 234 | -56 | 42 | -18 | 134 |
| 25% Cotton: 75% OOW | 46 | 133 | 57 | 172 | -54 | 33 | -43 | 72 |
| 25% Cotton: 75% AF | 40 | 117 | 52 | 142 | -60 | 17 | -48 | 42 |
| 25% Cotton: 75% AF/OOW | 50 | 184 | 95 | 241 | -50 | 84 | -5 | 141 |

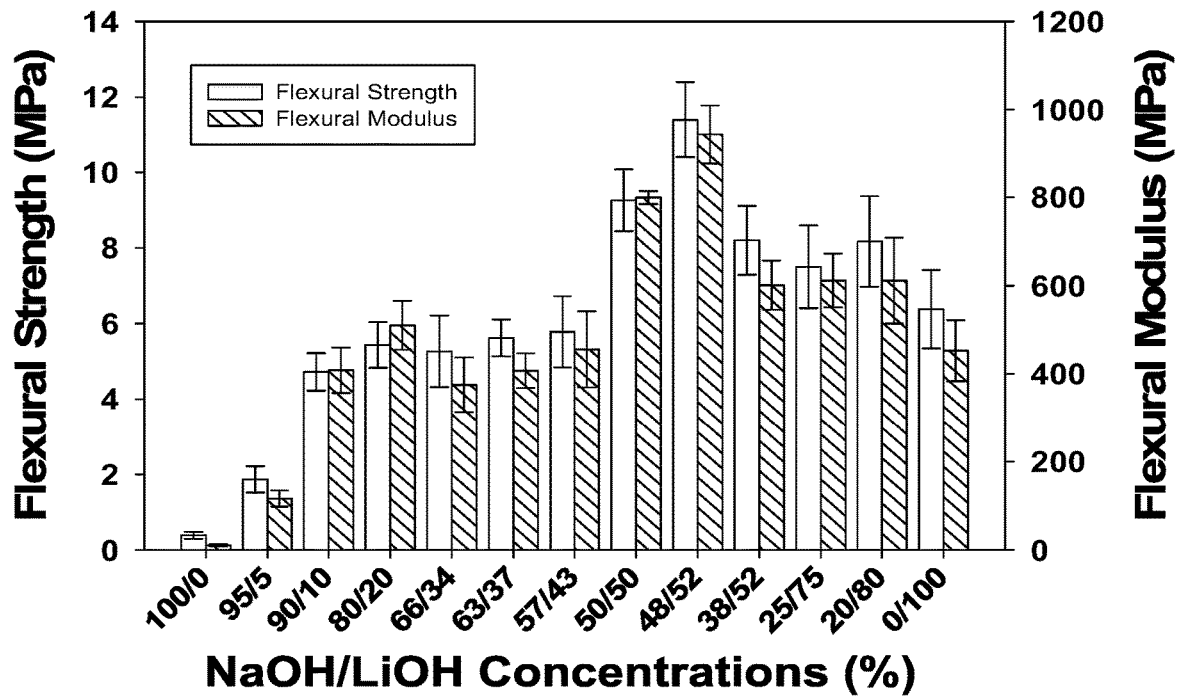
Figure 11. Influence of various concentration combinations on the flexural properties of LCs. Composite material contains 25% cotton:37.5% OOW particles (≤#40):37.5% Agave Particles (#6-#12).
| NaOH/LiOH | NaOH (%) | LiOH (%) | FS | FSse | FM | FMse |
|---|---|---|---|---|---|---|
| 100/0 | 8.9 | 0 | 0.4 | 0.1 | 11 | 2 |
| 95/5 | 7.4 | 0.4 | 1.9 | 0.4 | 116 | 18 |
| 90/10 | 8 | 0.9 | 4.7 | 0.5 | 409 | 52 |
| 80/20 | 6.2 | 1.6 | 5.4 | 0.6 | 510 | 55 |
| 66/34 | 5.2 | 2.7 | 5.3 | 0.9 | 375 | 62 |
| 63/37 | 5 | 2.9 | 5.6 | 0.5 | 408 | 39 |
| 57/43 | 4.4 | 3.3 | 5.8 | 0.9 | 456 | 86 |
| 50/50 | 4.4 | 4.4 | 9.3 | 0.8 | 799 | 15 |
| 48/52 | 4.4 | 4.8 | 11.4 | 1.0 | 943 | 66 |
| 38/52 | 4.4 | 5.3 | 8.2 | 0.9 | 601 | 56 |
| 25/75 | 3.6 | 6.2 | 7.5 | 1.1 | 612 | 61 |
| 20/80 | 2.7 | 7.6 | 8.2 | 1.2 | 612 | 97 |
| 0/100 | 0 | 8.1 | 6.4 | 1.0 | 453 | 69 |

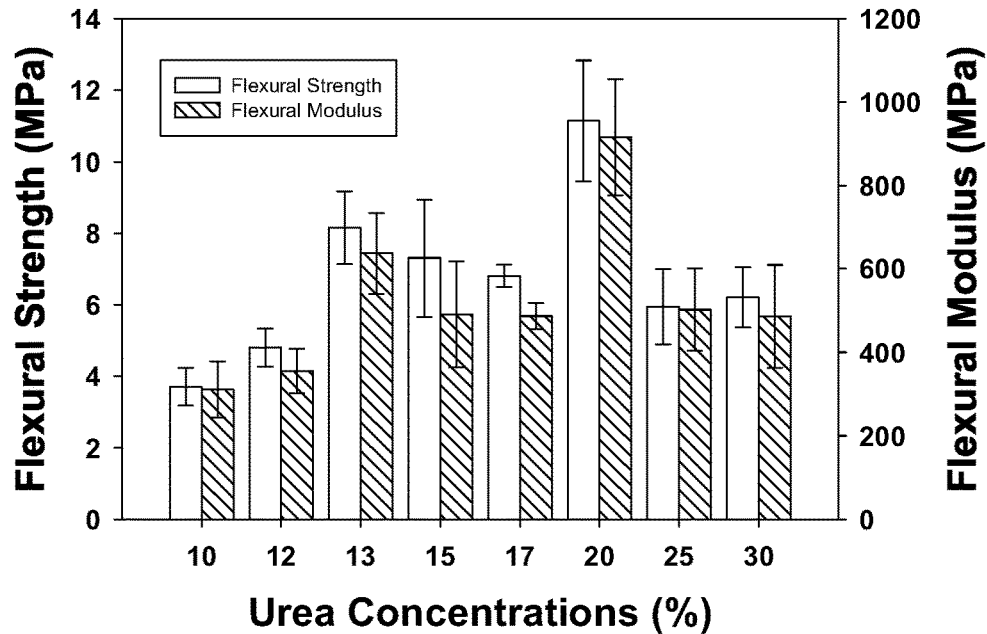
Figure 12. Influence of various concentrations of Urea mixed with 4.6% LiOH·H$_2$O on the flexural properties of LCs. Composite material contains 25% cotton:37.5% OOW particles (≤#40):37.5% Agave Particles (#6-#12).
| Urea (%) | FS | FSse | FM | Fmse |
|---|---|---|---|---|
| 10 | 3.7 | 0.53 | 310.7 | 67.18 |
| 12 | 4.8 | 0.54 | 355.3 | 53.35 |
| 13 | 8.2 | 1.03 | 636.8 | 97.44 |
| 15 | 7.3 | 1.64 | 490.4 | 126.76 |
| 17 | 6.8 | 0.31 | 486.7 | 31.04 |
| 20 | 11.1 | 1.69 | 915.9 | 138.19 |
| 25 | 5.9 | 1.05 | 502.1 | 98.70 |
| 30 | 6.2 | 0.83 | 485.8 | 123.00 |

LIGNOCELLULOSIC COMPOSITES PREPARED WITH AQUEOUS ALKALINE AND UREA SOLUTIONS IN COLD TEMPERATURES SYSTEMS

CROSS-REFERENCE TO RELATED APPLICATIONS

This application is a divisional of co-pending U.S. patent application Ser. No. 15/429,058, filed Feb. 8, 2017, which claims priority to U.S. Provisional Patent Application Ser. No. 62/293,172, filed Feb. 9, 2016, and U.S. Provisional Patent Application Ser. No. 62/377,316, filed Aug. 19, 2016, the entire disclosures of which are also incorporated herein by reference.

FIELD

The present invention relates generally to systems for and methods of generating Lignocellulosic Composites (LCs). More specifically, cold aqueous alkaline solvents are employed to prepare LCs.

BACKGROUND

"Lignocellulosic Composites" (LCs) are composite materials that have been recently developed. A wide variety of unique LCs have been demonstrated that are based on the establishment of new hydrogen binding between 'activated' cellulose and lignocellulosic fiber reinforcements.

Lignocellulosic biomass is an abundant raw material that is resistant to being broken down (i.e., bioconverted) into carbohydrate components that can be subsequently employed as intermediates for biobased fuels and products. To address the problem of difficulty in being broken down, several different pretreatment methods have been proposed (Li et al., 2010; Zhao et al., 2008). Lignocellulosic biomass is composed mainly of cellulose ((1-4)-linked chains of glucose molecules), hemicellulose (5- and 6-carbon sugars such as arabinose, galactose, glucose, mannose and xylose) and lignin (polymerized of three phenylpropanoid units: p-hydroxyphenyl, guaiacyl and syringyl). One intriguing method that has been proposed to break down the lignocellulosic bonds is to employ cold alkaline solvents (Cai and Zhang, 2005; Li et. al., 2010; Zhao et al., 2008; Zhou et al., 2004). Cold sodium hydroxide (7% NaOH) and sodium hydroxide/urea solutions (.about.7% NaOH/12% urea solution) at negative 12 degrees Celsius were capable of breaking linkages between cellulose which could be subsequently regenerated to synthesize cellulose derivatives (Li et al., 2010; Zhou et al., 2004). In some instances, cold alkaline treatments (e.g., 5% NaOH solution at negative 5 degrees Celsius) of lignocellulosic fibers causes homogenous swelling but did not result in dissolvement (Li et al., 2010). Similarly, aqueous alkaline treatment of spruce wood with NaOH or NaOH/urea mixture solutions at low temperatures disrupts hemicellulose, cellulose and lignin components and removes minor amounts of these components and makes cellulose more accessible to enzymatic hydrolysis (Li et al., 2010; Zhao et al., 2008). Li et al., (2010) found that aqueous alkaline/low temperatures treatments (.about.7% NaOH/ 12% urea solution at negative 12 degrees Celsius) cleaves lignin ester groups but otherwise only caused minor changes in the overall lignin structure. Cai and Zhang (2005) employed various aqueous alkaline/urea solvents coupled with low temperature regimes to dissolve cellulose and found that LiOH H.sub.2O/urea was superior to NaOH/urea or KOH/urea. Associated with these studies was the observation that dissolved cellulose materials could regenerate into novel all-cellulose composites (ACC) once the alkaline solution was removed (Cai and Zhang, 2005; Cai et al., 2004; Zhang et al., 2009; Li et al., 2014). These novel ACC should be considered "environmentally friendly" and can be "re-cycled" since the composite was entirely composed of cellulose or refined absorbent/non-absorbent cotton (Cai et al., 2004; Li et al., 2014). Cotton linter or refined absorbent/ non-absorbent cotton produced fibers via wet spinning following treatment with aqueous alkaline solutions with low temperatures (7% NaOH/12% Urea at negative 10 degrees Celsius) (Cai et al., 2004; Qi et al., 2009). ACC films (0.25 mm thick) composed of cellulose nanowhiskers and a cellulose matrix were produced using a cold aqueous alkaline solution (7% NaOH/12% Urea at negative 12 degrees Celsius) (Qi et al., 2009). Recently, a cold aqueous alkaline solution of LiOH H.sub.2O (4.6% LiOH H.sub.2O:15% Urea at negative 12 degrees Celsius) was employed to produce a nonporous cellulose gel (Li et al., 2014).

It should be recognized that these ACC were produced using complicated processes and were often employed from highly processed cellulose materials. These prior studies with ACCs were conducted using cellulose that was prepared at concentrations (typically around 4-6%) with aqueous alkaline solvents (94-96%). These prior studies are different from the present inventive concept in that the present inventive concept uses cellulose concentrations of 2-5% cellulose coupled with a lignocellulosic reinforcement concentration (7-17%) with a 78-91% aqueous alkaline solvent.

What is needed is a method to produce LCs where the resultant LCs (1) contain large quantities of abundant and inexpensive biomass materials, (2) do not contain any adhesives or resins, and (3) are completely biodegradable and compostable.

SUMMARY

The present inventive concept relates to systems and methods of generating LCs using cold aqueous alkaline solvents. 'Activated' cellulose comes from cellulose-containing materials (e.g., cotton, flax, kraft pulp) that have been at least partially solubilized by an appropriate ion-containing solvent at apposite conditions. Activated cellulose is able to flow because of solvent-assisted disruption to intermolecular (and intramolecular) hydrogen bonding within the material thereby creating an altered cellulosic matrix. Activated cellulose can then be mixed with reinforcement materials (i.e., loose fibers and organic particles) or can be infused into prefabricated materials such as biobased mats composed of high aspect ratio materials that may or may not contain particulate matter. Upon mixing with fibrous materials and particles, activated cellulose coats individual materials such that they are welded, cemented or glued into a continuous composite network material. Fibrous and particulate materials can include, but are not limited to, natural biobased materials such as lignocellulose (e.g., wood, hemp, flax, et cetera), proteins (e.g., DDGs, silk, keratin, press cakes et cetera), and/or 'functional' materials (e.g., magnetic micro and nanoparticles, conductive carbons, fire retardant clays, conductive polymers, et cetera).

In contrast with prior art studies where the final ACCs were generated containing 100% cellulose, the present inventive concept employs a semi-dissolved cellulose matrix at 15 to 35% concentration combined with lignocellulosic materials (65-85%) to generate the final LC. The cellulose matrix is mixed with a non-dissolved lignocellulose reinforcement at concentrations of 65 to 85% to obtain LCs. These LCs comprise a semi-dissolved cellulose matrix (for example and not by way of limitation, cotton) mixed with non-dissolved reinforcement biomass material (raw, untreated biomass) which subsequently form solid constructs. These LCs have several unique characteristics: 1) their composition contains large quantities of abundant and inexpensive biomass reinforcement materials, 2) they do not contain any adhesives or resins and 3) since they are entirely biological in origin, they are completely biodegradable and compostable.

In the example that follows, materials are able to be molded into shapes via dies and molds. In addition to the larger 'macro' shapes, the high surface interface between fibers, particles, and active cellulose produces small scale microscopic (e.g., micron sized and larger) surface topographies that are controllable by selection of suitable material mixtures. This is important for coating applications, for water permeability, and for decorative applications. The selection of fibrous and particulate reinforcements also determines the density of resulting LCs. For example, LCs comprised of larger, high aspect ratio fibers that are stiff and dense often benefit from the addition of smaller particulate materials to fill voids in-between and around the intersections of high aspect ratio fibers. Upon molding, the "activating" solvent is removed by dilution in excess polar solvent (e.g., soaking in excess water, citric acid, acid mixtures, acetonitrile, alcohols) and/or by reaction of ionic species. In addition, with regard to this reaction, for example, NaOH (which is capable of disrupting hydrogen bonding in cellulose) can be treated with an acid (e.g., acetic acid) to produce water and the conjugate base anion (e.g., acetate) that is not capable of disrupting hydrogen bonding within cellulose. With regard to dilution, "activating" solvent species (e.g., ion and molecular components) can be recovered and recycled for reuse by removing excess polar solvents by any combination of simple evaporation, distillation, filtration, membrane-based separations, et cetera. Upon removal of the solvent, a somewhat swollen material remains that contains excess polar solvent diluent (e.g., excess water, acetonitrile, alcohols, et cetera) that must be removed by drying to achieve the final product. Drying is accomplished by either simple evaporation, heat and/or vacuum (negative-pressure) assisted solvent removal techniques.

The process described herein may be used to generate LCs that exhibit mechanical and chemical properties suitable to directly compete with many existing commercial products/materials (e.g., fiberboard, plywood and OSB). In addition, the manufacturing process may readily utilize small fibers and particles in an 'open' initial format (as loose materials), prefabricated mats, or a combination of both, or fully or partially refined boards (resulting in plywood mimic). The inclusion of functional materials such as magnetic, electrical or naturally biobased anti-microbiological or insecticides ingredients into the LCs at the time of their manufacture will cause the final product to exhibit properties that are not currently available and may result in LCs that outperform commercial existing products as well. For example, conductive carbons may be included in fiber-based foam boards for integrated energy storage applications.

Generally speaking, LCs of the present inventive concept are (a) less expensive than many existing commercial products (because they do not utilize expensive petroleum-based or toxic glues or resins), (b) environmentally friendly (e.g., biodegradable and non-toxic), and (c) capable of being tailored physically (e.g., controllable density) and/or chemically (e.g., controllable biodegradability) to contain unique properties as desired.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

FIG. 4 shows the mechanical properties of LCs composed of 25% cotton and 75% OOW when prepared using various incubation temperatures.

FIG. 5 shows the mechanical properties of LCs composed of 25% cotton and 75% AF/OOW when prepared using various levels of cotton matrix concentration.

FIG. 6 shows the effect of LiOH·H2O/Urea volume on mechanical properties of panels composed of 10 g 25% Cotton: 75% AF/OOW.

FIG. 7 shows the effect of various alkaline aqueous solvent formulations on the mechanical properties of panels composed of 25% Cotton: 75% AF/OOW.

FIG. 8 shows the influence of various reinforcement components on the biocomposite mechanical properties.

FIG. 9 shows the normalized effect of reinforcement materials on the mechanical properties of LCs compared to HDPE.

FIG. 10 shows the normalized effect of reinforcement materials on the mechanical properties of LCs compared to PP.

FIG. 11 shows the empirical data observed to demonstrate the influence of various concentrations of solvents, NaOH and LiOH.H.sub.2O, on the flexural properties of LCs.

FIG. 12 shows the empirical data observed to demonstrate the influence of urea concentrations on the flexural properties of LCs.

DETAILED DESCRIPTION

Figure 1:
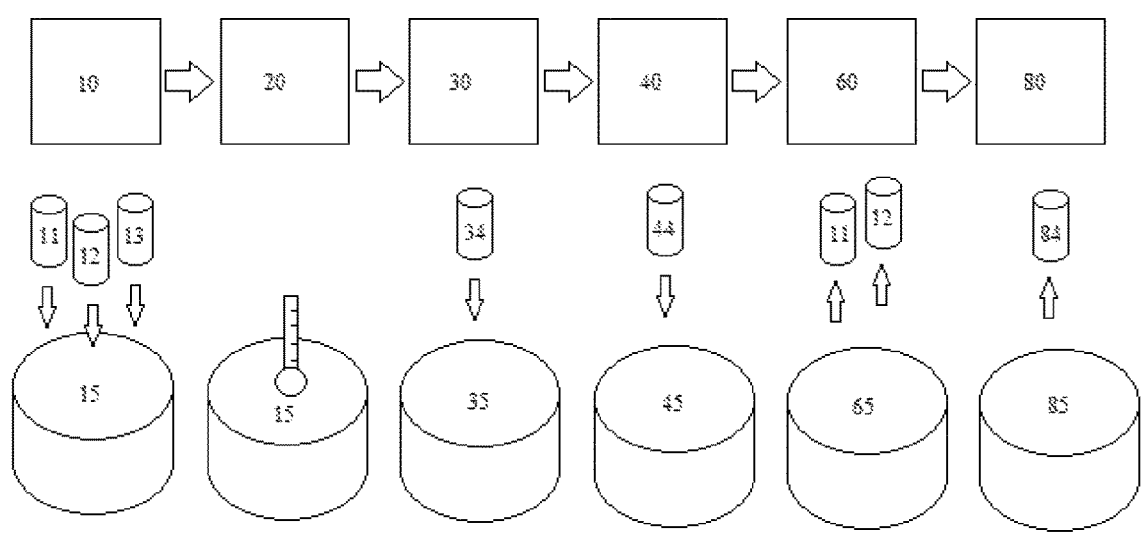
FIG. 1 shows an exemplary embodiment of a method for producing a lignocellulosic composite.

FIG. 1 shows an exemplary embodiment of a method for producing a lignocellulosic composite. According to FIG. 1, the steps of the method include: providing an alkaline solution 10, adjusting the temperature of the solution 20, combining refined cellulose with the solution 30, combining reinforcement material with the cellulose solution 40, removing the solvent and urea 60, and drying the remaining dough 80. According to FIG. 1, one of the steps of the method is to provide an alkaline solution 15, where the alkaline solution comprises a predetermined volume of solvent 11, a predetermined volume of urea 12 and a predetermined volume of water 13 and the alkaline solution 15 has a measurable temperature (shown as step 10 in FIG. 1). The alkaline solution 15 is comprised of three different components—solvent 11, urea 12 and water 13. Each of these three components are provided according to predetermined volumes. In some embodiments, each component of the alkaline solution 15 is provided in proportion to the other components, as a percentage of the total volume of the alkaline solution 15. For example, in some embodiments, the urea 12 is provided according to a predetermined volume that is in the range of 10% to 30% (by volume) of the total alkaline solution 15. In some embodiments, the solvent 11 is a metal alkaline salt. In some embodiments, the solvent 11 is LiOH H.sub.2O. In some embodiments, the solvent 11 is NaOH. In some embodiments the solvent 11 is KOH. In some embodiments, the solvent 11 is a combination of one or more of LiOH H.sub.2O, NaOH, KOH and/or some other metal alkaline salt. In some embodiments, at least 10% (by mass) of the total predetermined volume of solvent 11 is LiOH H.sub.2O. In some embodiments, at least 10% (by mass) of the total predetermined volume of solvent 11 is NaOH. In some embodiments, at least 10% (by mass) of the total predetermined volume of solvent 11 is KOH.

Referring to FIG. 1, another one of the steps of the method is to add or remove heat to adjust the measurable temperature of the alkaline solution 15 to a predetermined temperature, where the predetermined temperature is negative 10 degrees Celsius or lower (colder) (shown as step 20 in FIG. 1). Preferably, the temperature of the alkaline solution 15 is adjusted until it is negative 10 degrees Celsius or colder. In some embodiments, the temperature is adjusted until it is within the range of negative 15 degrees Celsius to negative 10 degrees Celsius.

Referring to FIG. 1, another one of the steps of the method is to combine a predetermined quantity of refined cellulose 34 with the alkaline solution 15 at the predetermined temperature to form a gel-like cellulose matrix 35 (shown as step 30 in FIG. 1). In some embodiments, wherein the step 30 of combining the predetermined quantity of refined cellulose 34 with the alkaline solution 15 at said predetermined temperature to form the gel-like cellulose matrix 35 is performed in a vacuum or negative-pressure environment. In some embodiments the refined cellulose 34 is any one (or combination of more than one) of cardboard, nanocellulose, crystalline cellulose, flax, cotton, recycled cotton, waste cotton, waste and stationary cellulosic fibers, shredded books, paper bags, paper towels, and stationary paper. In some embodiments, the refined cellulose 34 is small particles.

Referring to FIG. 1, another one of the steps of the method is to combine a predetermined quantity of reinforcement material 44 with the cellulose matrix 35 to form a dough 45. In some embodiments, the predetermined quantity of refined cellulose 34 is proportional to the predetermined quantity of reinforcement material 44. In some embodiments, the predetermined quantity of refined cellulose 34 is in the range of 15% to 35%, expressed as a percentage of a total of a combination of the predetermined quantity of refined cellulose 34 and the predetermined quantity of reinforcement material 44. In some embodiments, the predetermined quantity of refined cellulose 34 is in the range of 10% to 95%. In some embodiments, the predetermined quantity of reinforcement material 44 is in the range of 65% to 85%. In some embodiments, the predetermined quantity of reinforcement material 44 is in the range of 40% to 95%. In some embodiments, the predetermined quantity of refined cellulose 34 is 25% and the predetermined quantity of reinforcement material 44 is 75%. In some embodiments, the reinforcement material 44 is any one (or combination of more than one) of wood flour, wood fibers, lumber strips, wood chips, wood sawdust, agricultural stem and branch waste materials, flax fibers, hemp fibers, Kenaf fibers, corn fibers, recycled cotton, waste cotton, press cakes derived from oil seeds, dried distiller's grain, miscellaneous cotton ginning mill waste, Kenaf waste, waste cellulosic fibers, shredded books, paper bags, paper towels, stationary paper, woven processed mats, non-woven processed mats, and linings or bagging obtained from tree, herbs and crops. In some embodiments, the reinforcement material 44 is small particles. In some embodiments, the reinforcement material 44 is high aspect ratio fibers. In some embodiments, the reinforcement material 44 is low aspect ratio chips.

Referring to FIG. 1, another one of the steps of the method is to remove substantially all of the solvent 11 and urea 12 (shown as step 60 in FIG. 1). When the solvent is rinsed out, the remaining product is a dough 65.

Referring to FIG. 1, another one of the steps of the method is to dry the dough 65 (shown as step 80 in FIG. 1). When the dough 65 is properly dried, the remaining product is the LC product 85. In some embodiments, the step 80 of drying the dough 65 is performed in a negative pressure environment. In some embodiments, the step 80 of drying the dough 65 is performed in a higher temperature environment such as an oven.

Figure 2:
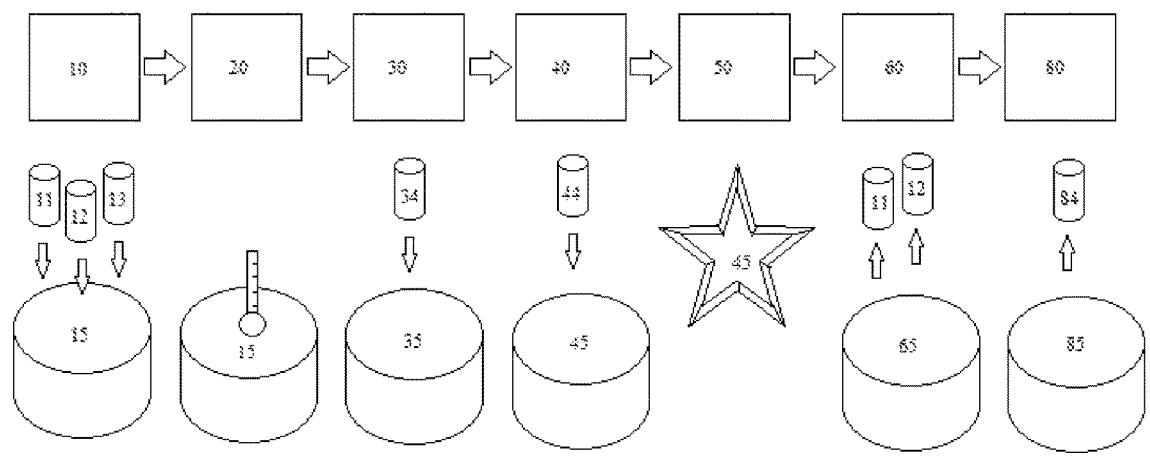
FIG. 2 shows another exemplary embodiment of a method for producing a lignocellulosic composite.

FIG. 2 shows another exemplary embodiment of a method for producing a lignocellulosic composite. According to FIG. 2, the steps of the method are the same as the steps shown in FIG. 1, but with one additional step (shown as step 50 in FIG. 2). According to FIG. 2 the dough 65 is formed into a predetermined shape 45. In some embodiments, before the step of removing substantially all of the solvent 11 (shown as step 60 in FIG. 2), the dough 65 is formed into a mold.

Figure 3:
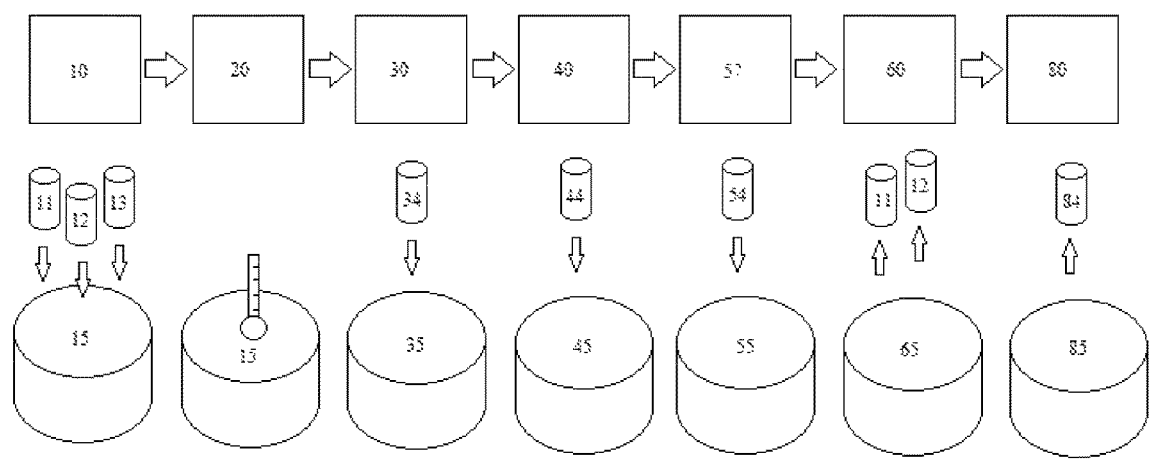
FIG. 3 shows another exemplary embodiment of a method for producing a lignocellulosic composite.

FIG. 3 shows another exemplary embodiment of a method for producing a lignocellulosic composite. According to FIG. 3, the steps of the method are the same as the steps shown in FIG. 1, but with one additional step of combining the cellulose matrix 35 with a functional material 54 (shown as step 57 in FIG. 3). In some embodiments, the functional material 54 is added to the cellulose matrix 35 before the reinforcement material 44 is added. In some embodiments, the functional material 54 is added to the cellulose matrix 35 at the same time that the reinforcement material 44 is added. In some embodiments, the functional material 54 is added to the dough 45 after the reinforcement material 44 is added. The functional material 54 is magnetic particles, conductive carbons, fire retardant clays, conductive polymers, microbiologicals, insecticides or other similar material.

In some embodiments, the present inventive concept is a lignocellulosic composite product produced according to any of the methods disclosed herein.

Throughout this disclosure, the inventors use the term small particles to mean refined or unrefined cellulosic particles, or predominantly cellulosic particles, having a length of less than 5 millimeters in every dimension. Throughout this disclosure, the inventors use the term high aspect ratio fibers to refer to lignocellulosic material having a length of equal to or greater than 5 millimeters in one dimension and less than 5 millimeters in every other dimension. Throughout this disclosure, the inventors use the term low aspect ratio chips to refer to lignocellulosic material having a length of equal to or greater than 5 millimeters in two or three dimensions.

Examples

In one example, the following materials were used. Cellulose (e.g., cotton linter, absorbent and non-absorbent cotton) was obtained from U.S. Cotton Company, Lachine, Quebec, Canada. Commercially available alkaline hydroxide (LiOH.sub.2O and NaOH), thiourea and urea were of analytical grade (Aldrich-Sigma, St. Louis, Mo.) and used as received without further purification. Agave (*Agave tequilana* F.A.C. Weber, Family Asparagaceae) fibers were obtained from leaves of 12 year-old plants grown in Jalisco, Mexico. Leaves were air dried and fibrous portion shipped to Peoria, Ill., USA. Agave fibers (AFs) were loosely separated by hand and sieved through #6 sieves and collected on #12 sieves and then cut into individual fibers varying from 15 mm to 30 mm in length.times.0.1-0.2 mm in thickness. Osage orange (*Maclura pomifera* (Raf) Scheid., Family Moraceae) wood particles were obtained from 20 years old trees grown in Missouri. Osage orange wood (OOW) was milled successively through 4-, 2- and 1-mm diameter stainless screens. Particles were then sized through a Ro-Tap™ shaker (Model RX-29, Tyler, Mentor, Ohio) employing 203 mm diameter steel screens. OOW particles that were screened through a #30 US Standards mesh (Newark Wire Cloth Company, Clifton, N.J.) were employed in further operations. These particles varied in size from 600 to 75 .mu.m in diam. The chemical composition of materials used in this example were: cotton (94% cellulose), OOW (33% cellulose, 17% hemicellulose, 40% lignin) and AF (43% cellulose, 19% hemicellulose, 15% lignin) (textile-fashionstudy.com; Salem and Mohamed, 2013; Iniguez et al., 2014). Materials were dried 48 hr at 60.degree. C. prior to use.

In the example, fabrication of the LC panels occurred as follows: Alkali hydroxide, thiourea, urea, and distilled water (.about.45 ml) formulations are shown in Table 1. Solvents were pre-cooled (.about.5 to −15.degree. C.) in a stainless steel vessel (75 mm diam.times.105 mm length-.times.450 ml cap.). Then 2.5 g of cellulose was immersed in the pre-cooled solvent and stirred for about 15 min employing a mixer (Model 1750, Arrow Engineering, Hillside, N.J.) fitted with a three-blade propeller at 350 rpm. This resulted in the partial dissolution of the cellulose to form a white translucent cellulose gel. Then, OOW particles (3.75 g) and AFs (3.75 g) were added to the vessel and stirred for an additional 10 min at 350 rpm. The resultant composite was transferred to a polyethylene foam rubber panel molds of 105 mm W.times.130 mm L.times.5 mm D with an internal opening of 80 mm W.times.100 mm L.times.5 mm D) and positioned between nettings of polyethylene mesh with 2 mm.sup.2 openings. Panels in molds were subjected to a solvent exchange treatment consisting of submergence in tap water under vacuum (negative pressure) for 15 min followed by continuous submergence in water for 24 hours punctuated with 6 water transfers. After the first hour of soaking the composite panels were firm enough to allow for the removal of the molds while retaining the netting in order to facilitate greater diffusion of the solutes into the water. At end of the soaking treatment, panels were damp dried on paper towels and placed between two steel plates at 0.5 psi (0.0034 MPa/3.4474 kN/m.sup.2) and dried in a vacuum (negative pressure) oven at 60.degree. C. at 25 inches Hg for 24 hr. Panels were subsequently densified by subjection to 8 tons pressure for 10 min at 180.degree. C.

TABLE 1

Alkaline Aqueous Solvent Test Formulations.

| Alkaline Aqueous Formulations (w/w) | Reference |
|---|---|
| 4.7% NaOH/12% Urea | Cai et al., 2004; Qi et al., 2009; Cai and Zhang, 2005 |
| 4.2% LiOH•H$_2$O/12% Urea | Cai and Zhang, 2005 |
| 8% NaOH/6.5% Thiourea/8% Urea | Zhang et al., 2009 |
| 4.6% LiOH•H$_2$O/15% Urea | Li et al., 2014 |
| 8% LiOH•H$_2$O/6.5% Thiourea/8% Urea | — |
| 4.2% LiOH•H$_2$O/6.5% Thiourea/8% Urea | — |

In the example, the experimental parameters according to Table 2 were observed. The following studies employed 4.6% LiOH.H.sub.20/15% Urea as the solvent (Li et al., 2014). Following each preparation test, the mechanical properties of the resultant LC panels were evaluated. To study the influence of reaction temperatures on the mechanical properties of LCs, a LC formulation comprising 25% Cotton and 75% OOW were prepared using −5, −7.5, −10, −12.5, or −15.degree. C. temperatures. Based on the resultant mechanical properties obtained from this study, a −12.5.degree. C. reaction temperature was employed thereafter. LCs formulations of various cotton matrix concentrations (15, 25, 30, or 35% cotton) with a 50/50 AF/OOW reinforcement material were tested. The influence of alkaline solvent volume (45, 60, 75, 90, or 105 ml) employed per panel using a LC formulation of 25% cotton and 75% AF/OOW reinforcement were tested. A comparison of several previously employed alkaline aqueous solvents, was conducted (Table 1). Alkaline aqueous solvent experiments were conducted with LCs composed of 25% Cotton: 75% AF/OOW using 60 ml aqueous solvent solution. Using 60 ml 4.6% LiOH.H.sub.20/15% Urea alkaline solvent the mechanical properties of panels composed of 100% Cotton, 25% Cotton:75% OOW, 25% Cotton:75% AF, or 25% Cotton:75% AF/OOW were tested. The influence of various urea concentrations was tested as shown in Table 2. Finally, testing various concentrations of combining NaOH and LiOH was conducted, see Table 2.

TABLE 2

Parameters of Experiments conducted[a]

| Experiment | Matrix (%) | Reinforcement (%) | Matrix Stirring (rpm:min) | Reinf. Stirring (rpm:min) | Reaction Temperature (° C.) | Solvent Volume (ml/panel) |
|---|---|---|---|---|---|---|
| Temperature | 25 | 75 OOW | 350:15 | 350:10 | −5, −7.5, −10, −12.5, or −15 | 45 |
| Matrix concentration | 15, 25, 30, or 35 | 85, 75, 70, or 65 AF/OOW | 350:15 | 350:10 | −12.5 | 45 |
| Solvent Volume | 25 | 75 AF/OOW | 350:15 | 350:10 | −12.5 | 45, 60, 75, 90, or 105 |
| Alkaline Treatments[b] | 25 | 75 AF/OOW | 350:15 | 350:10 | −12.5 | 60 |

TABLE 2-continued

Parameters of Experiments conducted[a]

| Experiment | Matrix (%) | Reinforcement (%) | Matrix Stirring (rpm:min) | Reinf. Stirring (rpm:min) | Reaction Temperature (° C.) | Solvent Volume (ml/panel) |
|---|---|---|---|---|---|---|
| Urea treatments[c] | 25 | 75 AF/OOW | 350:15 | 350:10 | −12.5 | 60 |
| NaOH/LiOH•H$_2$O[d] | 25 | 75 AF/OOW | 350:15 | 350:10 | −12.5 | 60 |

[a]All experiments unless noted otherwise were conducted using a 4.6% LiOH•H$_2$O/15% Urea alkaline aqueous formulation.
[b]See Table 1 for the alkaline aqueous formulations employed.
[c]Urea concentrations tested: 10, 12, 15, 17, 20, 25, 30% with 4.6% LiOH•H$_2$O.
[d]NaOH/ LiOH•H$_2$O combinations tested: 100/0, 66/34, 63/37, 57/43, 50/50, 48/52, 25/75, 20/80, and 0/100, respectively with 15% Urea.

In the example, the following mechanical tests were performed. LCs were punched with a clicker press fitted with specimen cutting dies to obtain ASTM test specimen sample bars: ASTM D790 flexural testing bar (12.7 mm W.times.63.5 mm L.times.1.5 mm thickness) and ASTM D638 Type V tensile testing bar (9.5 W mm grip area.times.3.2 mm neck.times.63.5 mm L.times.1.5 mm thickness.times.7.6 mm gage L). The Type V bars were used for the tensile strength property tests. The flexural bars were used to evaluate flexural properties.

Cut, dry LCs were conditioned for approximately 24 hours at standard room temperature and humidity (23.degree. C. and 50% RH) prior to any test evaluations. ASTM D638 Type V tensile bars, were tested for tensile modulus (E), and tensile strength (.sigma..sub.u) using a universal testing machine (UTM), Instron Model 1122 (Instron Corporation, Norwood, Mass.). The speed of testing was 5 mm/min. Three-point flexural tests were carried out according to ASTM-D790 specification on the Instron UTM Model 1122 using flexural bars. The flexural tests were carried out using Procedure B with a crosshead rate of 13.5 mm/min. The flexural strength (.sigma..sub.fm) and flexural modulus of elasticity (E.sub.b) were calculated. Five specimens of each formulation were tested. The average values and standard errors were reported. Comparisons of the mechanical properties of the LCs with commercial polyolefins were conducted through a normalization processes. The two common polyolefins tested were HDPE and PP matrix using Petrothene LS 5300-00 and Pro-fax SB891 (Equistar Chemical LP, Houston, Tex.), respectively. The specific physical properties and method to prepare injection molded tensile and flexural bars are described (Tisserat et al., 2013, 2014). A 30-ton molding machine (Model Engel ES 30, Engel Machinery Inc., York, Pa.) using an ASTM family mold to obtain HDPE or PP test bars. Set point temperatures (.degree. C.) for the four zone injection molding barrel were: feed=160; compression=166; metering=177; and nozzle=191. The mold temperature was 37.degree. C. Type V bars were used for the tensile strength property tests. The flexural bars (12.7 mm W.times.63.5 mm L.times.3.2 mm thickness) were used to evaluate flexural. Type V bars (9.5 mm W grip area.times.3.2 mm neck.times.63.5 mm L.times.1.5 mm thickness) were used to evaluate tensile mechanical properties of the composites. The average .sigma..sub.u, E, .sigma..sub.fm, and E.sub.b values of HDPE were 21.5, 339, 27.9, and 894, respectively. The average .sigma..sub.u, E, .sigma..sub.fm, and E.sub.b values of PP were 25.2, 576, 43.9, and 1386, respectively (Tisserat et al., 2013, 2014).

Rather than attempting to dissolve the entire mixture in an alkaline aqueous solvent as other prior art references attempt, the present inventive concept only partially dissolves the cellulose (for example, but not by way of limitation: cotton fiber) in order to obtain an "adhesive" or "plastic" matrix that is then mixed with biomass-reinforcement agents (e.g., OOW and/or AF). In the example described herein, attempts were conducted to prepare entirely cotton pulp, OOW, or AF or part cotton (25%) and OOW or AF or OOW/AF (75%) panels.

FIG. 4 shows the mechanical properties of LCs composed of 25% cotton and 75% OOW when prepared using various incubation temperatures. The cotton matrix formed a viscous gel at temperatures −10.degree. C. and lower; while the higher temperatures were less effective in dissolving the cotton to produce the gel state. The gel state is conducive to the adhesive qualities of the matrix to bind with lignocellulosic reinforcements. Both −12.5 and −15.degree. C. temperature preparation regimes produced a resultant LC that exhibited higher .sigma..sub.u, E, .sigma..sub.fm, and E.sub.b values than LCs produced under higher temperatures (i.e., −5 and −7.5.degree. C.). These results are similar to those of Cai and Zhang (2005) who tested a range of temperatures from −5 to −20.degree. C. with a 7% NaOH/12% urea solvent and found that −10.degree. C. produced the most stable solvent conditions to dissolve a 4% concentration of cellulose in order to prepare a final composite of 100% cotton. In contrast, the example of the present inventive concept obtained a final matrix of 25% cotton and only partially dissolved the cotton to form a viscous gel construct that, when mixed with 75% OOW, formed a solid LC construct. For example, the .sigma..sub.u, E, .sigma..sub.fm, and E.sub.b values of LCs prepared at −12.5.degree. C. exhibited a +108%, +151%, +183% and +203% increases versus LCs prepared using −5.degree. C.

Referring to FIG. 5, the concentration of the matrix material was found to influence the mechanical properties of the resultant LCs. LCs prepared with lower concentrations of cotton (e.g., 15 and 25%) have lower mechanical property values than LCs prepared using the higher concentrations of cotton (e.g., 30 and 35%). For example, LCs containing 35% cotton:65% AF/OOW exhibited the .sigma..sub.u, E, .sigma..sub.fm, and E.sub.b values that increased +135%, +343%, +153%, and +109%, respectively, versus LCs prepared using 15% cotton:85% AF/OOW. Mechanical properties of LCs containing 30 and 35% were essentially the same, indicating that optimum concentration of cotton was achieved in preparation of these LCs.

One advantage of the present inventive concept is to provide LCs inexpensively. Since the cost of cotton is a major cost of the LCs price compared to OOW, AF, or other lignocellulose reinforcement materials, the present inventive concept generates LCs containing low cotton concentrations (i.e., 9.5-35%) and high concentrations of lignocellulosic reinforcements (65-81%) that enhances the LCs mechanical properties.

Referring to FIG. 6, the influence of solvent volume on the resultant LCs mechanical values is shown. The optimum solvent volume to employ in the LC panel in this example was 60 ml/panel based on its mechanical values. LCs prepared using either 45 or 75 ml/panel usually had somewhat diminished mechanical properties compared to the 60 ml/panel. Use of 90 or 105 ml aqueous alkaline solvent to prepare panels resulted in a LC panel that had substantially lower mechanical properties than the 60 ml/panel.

Referring to FIG. 7, the effectiveness of employing different published and non-published solvent formulations to create LCs was evaluated based on their mechanical properties. All solvent formulations produced LCs; however their mechanical properties varied considerably. Table 3 shows the change in the LCs volume and weight during processing. Considerable volume and weight changes occurred in the LC panel materials during the processing steps. Originally, panels consisted of 10 g of cotton, OOW and AF and in the final panel only 8.2 g remained. The weight loss could easily be attributed to handling. However, since no adhesives or resins are involved in their manufacture of the LC panels and practically all the solvent is removed in their processing the result LCs panels comprise entirely of their original ingredients thus contributing toward this phenomenon.

TABLE 3

Dimensional and Weight Changes of LC Panels during processing

| Panel Treatment | Residual Panel Volume (mm$^3$) | Residual Wt. (g)* | Residual Panel Volume (%) | Residual Wt. (%)** |
| --- | --- | --- | --- | --- |
| Original | 40000 | 72 | 100 | 100 |
| Soaked | 40000 | 40 | 100 | 56 |
| Oven dry | 16800 | 8.3 | 42 | 12 |
| Compression | 8400 | 8.2 | 21 | 11 |

*Original panel contained 2.5 g cotton, 3.75 g agave fiber and 3.75 g OOW = 10 g total materials. Loss of materials is due to mishandling and water loss during drying.
**Residual Wt. (%) indicates the change in weight of the original LC material weight (72 g) during processing to the final weight (8.2 g).

Referring to FIG. 8, the influence of various ingredients to prepare different biocomposite formulations are shown. The 100% cotton formulation, although the most expensive material employed, had similar mechanical properties compared to the LCs of 25% cotton:75% OOW or the 25% cotton: 75% AF/OOW.

FIGS. 9 and 10 graphically compare the mechanical properties of various LCs with HDPE and PP by normalizing the LCs to known HDPE and PP materials. For example, the $a_u$, E, $\sigma_{fm}$, and $E_b$ values of the LCs containing 25% cotton:75% AF/OOW were −34, +543, −17, and +273% of that of neat HDPE, respectively. Similarly, the $\sigma_u$, E, $\sigma_{fm}$, and $E_b$ of LCs containing 25% cotton:75% AF/OOW were −50, +84, −5, and +141% of that of neat PP, respectively. Thus, the reinforced LCs compare favorably to commercial polyolefins.

In one exemplary embodiment, the cellulose-solvent gel matrix was prepared according to the following vacuum (negative pressure) procedure: Two hundred-ten ml of solvent was transferred to a 1 liter stainless steel beaker in a vacuum desiccator and 7.85 g of absorbent cotton was added and then given 25 in Hg for 5 min at room temperature. The beaker was transferred to cold bath and allowed to cool to −12.5.degree. C. Once the cellulose-solvent mixture obtained −12.5.degree. C. an additional 5 min of incubation was administered. Gel was noted to be devoid of any residual unreacted solvent or a watery feel when kneaded and felt very hard and doughy.

In other exemplary embodiments, the cellulose employed in the cellulose solvent gel matrix includes any of the following: refined cellulose (crystalline or wood flours), wood sawdust and wood fibers, flax fibers, hemp fibers, Kenaf fibers, corn fibers from corn husks, recycled cotton, waste cotton from ginning mills, waste cellulosic fibers including: shredded yellow and white pages, paper bags, paper towels (white and brown), and stationary paper (computer and writing paper).

In some exemplary embodiments, the reinforcement or filler employed in the LCs includes any of the following: wood flour and wood fibers and lumber strips, wood chips and sawdust, agricultural stem and branch waste materials, flax fibers, hemp fibers, Kenaf fibers, corn fibers from corn husks and stems, recycled cotton, waste cotton from ginning mills, press cakes derived from oil seeds, dried distiller's grain, miscellaneous cotton ginning mill waste, Kenaf fibers, waste cellulosic fibers including: shredded yellow and white pages, paper bags, paper towels (white and brown), stationary paper (computer and writing paper), woven or non-woven processed mats, and linings or bagging obtained from tree, herbs and crops.

In some embodiments, the LCs achieve additional functional performance with the inclusion of magnetic materials and carbon black and graphene carbon to allow the LCs to store an electrical charge or to carry a current. In some embodiments, incorporation of certain types of woods such as Osage orange will confer anti-fungal and anti-pesticidal properties.

In some embodiments, the LCs are improved further after initial fabrication. Soaking LCs in several different types of sugars with and without citric acid and/or ionic liquids results in the formation of esterification linkages which improves mechanical properties. In some embodiments, the LC is formed into a specific shape, before, during and/or after drying.

In some embodiments, LCs are employed to bind wood and non-woven matting materials. LCs substitute for glue-type adhesives to bind two or more wood panels. In one example, wood panels of various sources with dimensions of 1/32", 1/8", 1/4", or 1/2": 0.79 mm, 3.175 mm, 6.35 mm, or 12.7 mm thickness were bound together using a LC as the adhesive material. These composites can achieve thickness of 1/2 to 1" thickness or larger. A LC of the present inventive concept is prepared and pressed between two or more wood panels using vacuum pressing or a carver press. Following pressing, the material is transferred to water to remove the solvent, and then dried in a vacuum (negative pressure) oven at 60.degree. C. These composites resemble fiberboard and cannot be easily pulled apart and resemble those of commercial plywood construction with the exception that the lignocellulosic composite is serving as the adhesive material.

By way of another example, but not by way of limitation, the influence of various concentrations of solvents, NaOH and LiOH.H.sub.2O, on the flexural properties of LCs was documented. In this example, LCs were prepared as previously described containing 25% cotton; 37.5% OOW particles (.ltoreq. #40): and 37.5% Agave Particles (#6-#12). Alkaline solvents employed consisted of various concentrations of NaOH/LiOH.H.sub.2O including: 100/0, 95/5, 90/10, 80/20, 66/34, 64/37, 57/43, 50/50, 48/52, 38/62, 25/75, 20/80, or 0/100, respectively. Alkaline solvent solutions all contained 15% Urea. Referring to FIG. 11, a synergistic effect occurs in the flexural properties of LCs depending on the ratio of NaOH/LiOH.sub.2O employed. More favorable flexural values were obtained from LCs employing an alkaline solvent composed of a combination of the NaOH/LiOH.H.sub.2O versus using an alkaline solvent of solely NaOH or LiOH.H.sub.2O only.

By way of another example, but not by way of limitation, the influence of urea concentrations on the flexural properties of LCs was documented. In this example, LCs were prepared as previously described containing 25% cotton: 37.5% OOW particles (.ltoreq. #40):37.5% Agave Particles (#6-#12). Alkaline solvents employed consisted of various concentrations of Urea including: 10, 12, 13, 15, 17, 20, 25, or 30%. Alkaline solvent solutions all contained 4.6% LiOH.H.sub.2O. Referring to FIG. 12, Flexural properties of LCs employing an alkaline solution containing 10 and 12% Urea were decidedly less than employing higher Urea concentrations. Highest flexural properties were obtain from LCs generated using 20% Urea.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

REFERENCES

The following references are cited throughout this disclosure and are incorporated by reference. Applicant makes no statement, inferred or direct, regarding the status of these references as prior art. Applicant reserves the right to challenge the veracity of statements made in these references.

Cai, J. and L. Zhang. 2005. Rapid dissolution of cellulose in LiOH/urea and NaOH/urea aqueous solutions. Macromol. Biosci. 5:539-548.

Cai, J., Zhang, L., Zhou, J., Li, H., Chen, H. and Jin, H. 2004. Novel fibers prepared from cellulose in NaOH/Urea aqueous solution. Macromol. Rapid Commun. 25:1558-1562.

Cai, J., Zhang, L., Liu, S., Liu, Y., Xu, X., Chen, X., Chu, B., Guo, X., Xu, J., Cheng, H., Han, C. C., and Kuga, S. 2008. Dynamic self-assembly induced rapid dissolution of cellulose at low temperature. Macromolecules 41:9345-9351.

Chen, X., Burger, C., Wan, F., Zhang, J., Rong, L., Hsiao, B. S., Chu, B. Cai, J., and Zhang, L. 2007. Structure study of cellulose fibers wet-spun from environmentally friendly NaOH/urea aqueous solutions. Biomacromolecules. 8:1918-1926.

Davis, S. C., F. G. Dohleman and S. P. Long. 2011. The global potential for Agave as a biofuels feedstock. GCB Bioenergy 3:68-78.

Elenga, R. G., Djemia, P., Tingaud, D., Chauveau, T., Maniongui, J. G., and Dirras, G. 2013. Effects of alkali treatment on the microstructure, composition, and properties of the *Raffia textilis* fiber. BioResources. 8(2):2934-2949.

Fu, L. H., Ma, M. G., Bian, J., Deng, F., and Du, X. 2014. Research on the formation mechanism of composites from lignocelluloses and CaCO.sub.3. Materials Science and Engineering C. 44:216-224.

Gan, S., Padzil, F. N. M., Zakaria, S., Chia, C. H., Jaafar, S. N. S., and Chen, R. S. 2015. Synthesis of liquid hot water cotton linter to prepare cellulose membrane using NaOH/urea or LiOH/urea. BioResources. 10(2):2244-2255.

Glad, B. E. and Kriven, W. M. 2014. Geopolymer with hydrogel characteristics via silane coupling agent additives. J. Am. Ceram. Soc. 97:295-302.

Heinze, T. and Koschella, A. 2005. Solvents applied in the field of cellulose chemistry—a mini review. Polimeros: Ciencia e Tecnologia. 15(2):84-90.

Iniguez, C. G., C. J. J. Bernal, M. W. Ramirez, and N. J. Villalvazo. 2014. Recycling Agave bagasse of the tequila industry. Advances in Chemical Engineering and Science 4 (2): 135-142.

Keshk, S. 2015. Effect of different alkaline solutions on crystalline structure of cellulose at different temperatures. Carbohydrate Polymers. 115:658-662.

Kestur G., S., T. H. S. Fores-Sahagun, L. P. Dos Santos, J. Dos Santos, I. Mazzaro, and A. Mikowsi. 2013. Characterization of blue agave bagasse fibers of Mexico. Composites: Part A 45: 153-161.

Kihlman, M., Aldaeus, F., Chedid, F., and Germgard, U. 2012. Effect of various pulp properties on the solubility of cellulose in sodium hydroxide solutions. Holzforschung. 66:601-606.

Kihlman, M., Medronho, B. F., Romano, A., Germgard, U., and Lindman, B. 2013. Cellulose dissolution in an alkali based solvent: influence of additives and pretreatments. J. Braz. Chem. Soc. 24(2):295-303.

Li, K., Song, J., Xu, M., Kuga, S., Zhang, L., Cai, J. 2014. Extraordinary reinforcement effect of three-dimensionally nanoporous cellulose gels in poly(s-caprolactone) bionanocomposites. Appl. Mat. Interfaces. 6:7204-7213.

Li, M.-F., Fan, Y.-M., Sun, R.-C., Xu, F. 2010. Characterization of extracted lignin of bamboo (*Neosinocalamus affinis*) pretreated with sodium hydroxide/urea solution at low temperature. BioResources 5(3), 1762-1778.

Liu, L., Sun, J., Cai, C., Wang, S., Pei, H., and Zhang, J. 2009. Corn stover pretreatment by inorganic salts and its effects on hemicellulose and cellulose degradation. Bioresource Technology. 100:5865-5871.

Lue, A., Liu, Y., Zhang, L., and Potthas, A. 2011. Light scattering study on the dynamic behavior of cellulose inclusion complex in LiOH/urea aqueous solution. Polymer. 52:3857-3864.

Mao, Y., Zhang, L., Cai, J., Zhou, J., and Kondo, T. 2008. Effects of coagulation conditions on properties of multifilament fibers based on dissolutions of cellulose in NaOH/urea aqueous solution. Ind. Eng. Chem. Res. 47:8676-8683.

Medronho, B. and Lindman, B. 2014. Competing forces during cellulose dissolution: from solvents to mechanisms. Current Opinion in Colloid & Interface Science. http .

Medronho, B. and Lindman, B. 2015. Brief overview on cellulose dissolution/regeneration interactions and mechanisms. Advances in Colloid and Interface Science. 222:502-508.

Nechita, P., Dobrin, E., Ciolacu, F., and Bobu, E. 2010. The biodegradability and mechanical strength of nutritive pots for vegetable planting based on lignocellulose composite materials. BioResources. 5(2): 1102-1113.

Pauksáta, D. and Borysiak, S. 2013. The influence of processing and the polymorphism of lignocellulosic fillers on the structure and properties of composite materials—a review. Materials. 6:2747-2767.

Perez-Pimienta, J. A., M. G. Lopez-Ortega, P. Varanasi, V. Stavila, G. Cheng, S. Singh, and B. A. Simmons. 2013. Comparison of the impact of ionic liquid pretreatment on recalcitrance of agave bagasse and switchgrass. Bioresource Technology 127:18-24.

Pinkert, A., Marsh, K. N., Pang, S., and Staiger, M. P. 2009. Ionic liquids and their interaction with cellulose. Chem. Rev. 109:6712-6728.

Qi, H., Cai, J., Zhang, L. and Kuga, S. 2009. Properties of films composed of cellulose nanowhiskers and a cellulose matrix regenerated from alkali/urea solution. Biomacromolecules 10:1597-1602.

Qin, X., Lu, A., Cai, J., and Zhang, L. 2013. Stability of inclusion complex formed by cellulose in NaOH/urea aqueous solution at low temperature. Carbohydrate Polymers. 92:1315-1320.

Salem, M. Z. M. and N. H. Mohamed. 2013. Physicochemical characterization of wood from *Maclura pomifera* (Raf) C. K. Schneid. Adapted to the Egyptian environmental conditions. Journal of Forestry Products & Industries, 2 (2): 53-57.

Sarul, T. I., Akdogan, A., and Koyun, A. 2010. Alternative production methods for lignocellulosic composite materials. Journal of Thermoplastic Composite Materials. vol. 23: 375-384.

Satyanarayana, K. G., Arizaga, G. G. C., and Wypych, F. 2009. Biodegradable composites based on lignocellulosic fibers—an overview. Progress in Polymer Science. 34:982-1021.

Smith, J. L. and J. V. Perino. 1981. Osage orange (*Maclura pomifera*): history and economic uses. Economic Botany 35 (1): 24-41.

Sen, S., Martin, J. D., and Argyropoulos, D. S. 2013. Review of cellulose non-derivatizing solvent interactions with emphasis on activity in inorganic molten salt hydrates. ACS Sustainable Chem. Eng. 1:858-870.

Textile Technologist. What is cotton Fiber I Chemical composition of cotton fiber. Jun. 23, 2012, http://textilefashionstudy.com/what-is-cotton-fiber-chemical-composition--of-cotton-fiber/

Tisserat, Tisserat, B., Larson, E., Gray, D., Dexter, N., Meunier, C., Moore, L., and Haverhals, L. 2015. Ionic liquid-facilitated preparation of lignocellulosic composites. International Journal of Polymer Science. Article ID 181097.

Tisserat, B., Reifschneider, L., Harry O'Kuru, R., and Finkenstadt, V. L. "Mechanical and thermal properties of high density polyethylene—died distillers grains with soluble composites," BioResources, vol. 8, no. 1, pp. 59-75, 2013.

Tisserat, B., Reifschneider, L., Grewell, D., and Srinivasan, G. "Effect of particle size, coupling agent and DDGS additions on *Paulownia* wood polypropylene composites," Journal of Reinforced Plastics and Composites, vol. 33, no. 14, pp. 1279-1293, 2014.

Tronc, E., C. A. Hernandez, R. Ibarra-Gtmez, A. Estrada-Monje, J. Navarrete-Bolafios and E. A. Zaragova-Contreras. 2007. Blue agave fiber esterification for the reinforcement of thermoplastic composites. Carbohydrate Polymers. 67:245-255.

Wynia, R., (2011). Plant Guide for Osage orange (*Maclura pomifera*). USDA-Natural Resources Conservation Service, Manhattan Plant Materials Center. Manhattan, Kans. 66502. (http://plants.usda.gov/plantguide/pdf/pg_mapo.pdf).

Zhang, L. and Hu, Y. 2014. Novel lignocellulosic hybrid particleboard composites made from rice straws and coir fibers. Materials and Design. 55:19-26.

Zhang, L., Ruan, D., and Gao, S. 2002. Dissolution and regeneration of cellulose in NaOH/thiourea aqueous solution. Journal of Polymer Science: Part B: Polymer Physics. 40:1521-1529.

Zhang, S., Li, F., Yu, J. and Gu, L. 2009. Novel fibers prepared from cellulose in NaOH/thiourea/urea aqueous solution. Fibers and Polymers 20(1):34-39.

Zhao, Y., Wnag, Y., Zhu, J. Y., Ragauskas, A., Deng, Y. 2008. Enhanced enzymatic hydrolysis of spruce by alkaline pretreatment at low temperature. Biotechnology and Bioengineering. 99(6), 1320-1328.

Zhou, J., Zhang, L., Cai, J., and Shu, H. 2002. Cellulose microporous membranes prepared from NaOH/urea aqueous solution. Journal of Membrane Science. 210:77-90.

U.S. Pat. Nos. 6,245,385, 6,423,000, 8,202,398, 8,574,385, 8,709,150 8882924, 9120701, 9163123, 9175147, 9187624, 9187865, 9193851, and 9228081 and United States patent application publication numbers 20100038047, 20120178921, 20120231254, 20140088252, 20140090157, 20150284567, 20150284568, 20150284566, 20150366244, and 20150368371.

The invention claimed is:

1. A composition comprising refined cellulosic material and untreated lignocellulosic reinforcement material, wherein said composition does not comprise an adhesive and does not comprise a resin, and wherein the composition is completely biodegradable and compostable.

2. The composition of claim 1, wherein the composition comprises 15%-35% by weight of the refined cellulosic material and 65%-85% by weight of untreated lignocellulosic reinforcement material.

3. The composition of claim 2, wherein the composition comprises about 25% by weight of the refined cellulosic material and about 75% by weight of untreated lignocellulosic reinforcement material.

4. The composition of claim 1, wherein the untreated lignocellulosic reinforcement material consists of high aspect ratio fibers.

5. The composition of claim 4, wherein said high aspect ratio fibers have a length of equal to or greater than 5 millimeters in one dimension and less than 5 millimeters in every other dimension.

6. The composition of claim 1, wherein the untreated lignocellulosic reinforcement material consists of low aspect ratio chips.

7. The composition of claim 6, wherein said low aspect ratio chips have a length of equal to or greater than 5 millimeters in two or three dimensions.

8. The composition of claim 1, wherein the untreated lignocellulosic reinforcement material comprises one or more of wood flour, wood fibers, lumber strips, wood chips, wood sawdust, agricultural stem and branch waste materials, flax fibers, hemp fibers, Kenaf fibers, corn fibers, recycled cotton, waste cotton, press cakes derived from oil seeds, dried distiller's grain, miscellaneous cotton ginning mill waste, Kenaf fibers, waste cellulosic fibers, shredded books, paper bags, paper towels, stationary paper, woven processed mats, non-woven processed mats, and linings or bagging obtained from tree, herbs and crops.

9. The composition of claim 1, wherein the refined cellulosic material comprises cellulose from partially solubilized cellulose-containing material.

10. The composition of claim 1, wherein the refined cellulosic material comprises any one or more of cardboard, nanocellulose, crystalline cellulose, flax, cotton, recycled cotton, waste cotton, waste and stationary cellulosic fibers, shredded books, paper bags, paper towels, and stationary paper.

11. The composition of claim 1, wherein the refined cellulosic material is cotton with a cellulose content of about 94% by weight.

12. The composition of claim 1, wherein the untreated lignocellulosic reinforcement material consists of any one or both of Osage orange wood and agave fibers.

13. The composition of claim 1, wherein the untreated lignocellulosic reinforcement material comprises 33% cellulose by weight, 17% hemicellulose by weight, and 40% lignin by weight.

14. The composition of claim 1, wherein the untreated lignocellulosic reinforcement material comprises 43% cellulose by weight, 19% hemicellulose by weight, and 15% lignin by weight.

15. A biodegradable lignocellulosic composition comprising about 25% by weight of activated cellulose and about 75% by weight of untreated lignocellulosic reinforcement material having a length of equal to or greater than 5 millimeters in one dimension.

16. The biodegradable lignocellulosic composition of claim 15, wherein the activated cellulose is produced by partially solubilizing a cellulose-containing material in an alkaline solution.

17. The biodegradable lignocellulosic composition of claim 16, wherein the cellulose-containing material comprises any one or more of cardboard, nanocellulose, crystalline cellulose, flax, cotton, recycled cotton, waste cotton, waste and stationary cellulosic fibers, shredded books, paper bags, paper towels, and stationary paper.

18. The biodegradable lignocellulosic composition of claim 15 consisting of about 15%-35% by weight of said activated cellulose and about 65%-85% by weight of said untreated lignocellulosic reinforcement material.

19. A composite lignocellulosic composition produced by:
providing an alkaline solution comprising a predetermined volume of solvent, a predetermined volume of urea and a predetermined volume of water, said alkaline solution having a measurable temperature;
adding or removing heat to adjust the measurable temperature of the alkaline solution to a predetermined temperature, wherein the predetermined temperature is negative 10 degrees Celsius or lower;
combining a predetermined quantity of cellulose with the alkaline solution at said predetermined temperature to form a cellulose matrix;
combining a predetermined quantity of reinforcement material, which comprises cellulose, lignin, and hemicellulose and has a length of equal to or greater than 5 millimeters in one dimension, with the cellulose matrix gel to form a reinforcement-containing cellulose gel;
removing substantially all of the solvent and urea from the reinforcement-containing cellulose gel by solvent exchange in water to form a dough;
molding the dough into a predetermined shape; and then drying the dough.

20. The composite lignocellulosic composition of claim 19 comprising about 15%-35% by weight of the cellulose and 65%-85% by weight of the reinforcement material, wherein said composite lignocellulosic composition does not comprise an adhesive or a resin.

* * * * *

UNITED STATES PATENT AND TRADEMARK OFFICE
CERTIFICATE OF CORRECTION

| | | |
|---|---|---|
| PATENT NO. | : 12,060,679 B2 | Page 1 of 1 |
| APPLICATION NO. | : 17/212345 | |
| DATED | : August 13, 2024 | |
| INVENTOR(S) | : Brent Tisscrat, Luke Haverhals and Zengshe Liu | |

It is certified that error appears in the above-identified patent and that said Letters Patent is hereby corrected as shown below:

In the Specification

Column 13: Line 18: Delete the word "obtain" and insert the word --obtained--.

Column 14: Line 57: After the letters "http" insert the website --://dx.doi.org/10.1016/j.cocis.2013.12.001--.

Signed and Sealed this
Tenth Day of June, 2025

Coke Morgan Stewart
*Acting Director of the United States Patent and Trademark Office*